(12) United States Patent
Dare et al.

(10) Patent No.: US 7,769,690 B2
(45) Date of Patent: Aug. 3, 2010

(54) METHOD AND SYSTEM FOR THE SUPPLY OF DATA, TRANSACTIONS AND ELECTRONIC VOTING

(75) Inventors: Peter Roy Dare, Hampshire (GB); John Owlett, Hampshire (GB); Imran Faiz Tyabji, London (GB)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 10/495,059

(22) PCT Filed: Oct. 21, 2002

(86) PCT No.: PCT/GB02/04759

§ 371 (c)(1),
(2), (4) Date: Oct. 29, 2004

(87) PCT Pub. No.: WO03/041338

PCT Pub. Date: May 15, 2003

(65) Prior Publication Data

US 2005/0065799 A1    Mar. 24, 2005

(30) Foreign Application Priority Data

Nov. 6, 2001   (GB) ................................. 0126596.6
Apr. 23, 2002  (GB) ................................. 0209221.1
May 24, 2002   (GB) ................................. 0211972.5

(51) Int. Cl.
*G06F 21/00*   (2006.01)
(52) U.S. Cl. .......................................... 705/50; 726/10
(58) Field of Classification Search ................... 705/64, 705/50; 726/10
See application file for complete search history.

(56) References Cited

U.S. PATENT DOCUMENTS 4,868,877 A * 9/1989 Fischer ........................ 713/157

(Continued)

FOREIGN PATENT DOCUMENTS

CN          1244936          2/2000

(Continued)

OTHER PUBLICATIONS

Schneier, B., "Applied Crypotography, Second Edition, Passage", Applied Cryptography, Protocols, Algorithms, and Source Code in C, New York, John Wiley & Sons, US 1996, pp. 125-134, XP002236877, ISBN: 04-471-11709-9.

*Primary Examiner*—Andrew J. Fischer
*Assistant Examiner*—Jamie Kucab
(74) *Attorney, Agent, or Firm*—William E. Schiesser; Roberts Mlotkowski Safran & Cole, P.C.

(57) ABSTRACT

A method and system for supply of data relating to a described entity (302) to a relying entity (304), which includes the generation of a first digital certificate referred to as an empowerment certificate signed by a first signing entity. The empowerment certificate includes attributes of the described entity (302) information and identifying the first signing entity. It also includes an indication of data relating to the described entity (302) which is to be supplied and an indication of one or more sources (306) for said data. The empowerment certificate also includes identification of relying entities (304) to which the data can be supplied. The relying entity (304) forwards the empowerment certificate to source (306) supplying the data indicated in the empowerment certificate. Some or all of the data relating to the described entity (302) may be supplied by means of a second digital certificate referred to as a custom certificate, signed by a second signing entity. Custom certificates may appear in custom certificate revocation lists. A system and method for transfer of ownership of electronic property (801) from a first entity to a second entity are also provided. A method and system for electronic voting are also provided.

54 Claims, 17 Drawing Sheets

U.S. PATENT DOCUMENTS

| | | | |
|---|---|---|---|
| 5,825,880 A * | 10/1998 | Sudia et al. | 713/180 |
| 5,903,882 A * | 5/1999 | Asay et al. | 705/44 |
| 6,035,402 A * | 3/2000 | Vaeth et al. | 726/2 |
| 6,108,788 A * | 8/2000 | Moses et al. | 713/155 |
| 6,237,096 B1 * | 5/2001 | Bisbee et al. | 713/178 |
| 6,332,133 B1 | 12/2001 | Takayama | |
| 6,339,824 B1 * | 1/2002 | Smith et al. | 713/157 |
| 7,177,839 B1 | 2/2007 | Claxton et al. | |
| 7,178,029 B2 * | 2/2007 | Ansper et al. | 713/176 |
| 7,215,773 B1 * | 5/2007 | Johnson | 380/44 |
| 7,287,158 B2 * | 10/2007 | Futamura et al. | 713/156 |
| 2001/0011255 A1 | 8/2001 | Asay et al. | |
| 2001/0053226 A1 * | 12/2001 | Akins et al. | 380/282 |
| 2002/0138633 A1 * | 9/2002 | Angwin et al. | 709/229 |
| 2003/0088771 A1 * | 5/2003 | Merchen | 713/175 |
| 2007/0143407 A1 * | 6/2007 | Avritch et al. | 709/206 |

FOREIGN PATENT DOCUMENTS

| | | |
|---|---|---|
| JP | 10-198739 | 7/1998 |
| JP | 2001-507145 | 5/2001 |
| JP | 2001-265771 | 9/2001 |
| WO | 2000/045564 | 8/2000 |

* cited by examiner

METHOD AND SYSTEM FOR THE SUPPLY OF DATA, TRANSACTIONS AND ELECTRONIC VOTING

CROSS-REFERENCE TO RELATED APPLICATIONS

This application is a national stage application of and claims priority from PCT International Application Number PCT/GB02/04759 filed 21 Oct. 2002, which claims priority from GB Application Number 0126596.6 filed 6 Nov. 2001. These disclosures are hereby incorporated by reference herein in their entireties. PCT International Application Number PCT/GB02/04759 was published in the English language as International Publication Number WO 03/041338 A1 on 15 May 2003.

FIELD OF THE INVENTION

The invention relates to a method and system for supply of data, a method for providing a digital signature and digital certificates, a method and system for transfer of ownership of electronic property and a method and system for electronic voting. The field of the invention is public key cryptography.

BACKGROUND OF THE INVENTION

Public key cryptography uses an asymmetric algorithm in which the encryption and decryption keys are different and for which it is infeasible to compute one key knowing only the other. Users receive (or, with suitable hardware or software, can generate for themselves) a pair of keys—that is, two large numbers. The user keeps one of these keys private and never discloses it. The other key can be safely made public, just like a phone number or similar personal data. Because of the nature of the algorithm and the way the keys are generated, information encrypted with the private key can only be decrypted with the public key and vice versa. So the sender and receiver do not need to share any secret.

Public key cryptography enables several possibilities:

Anyone knowing the user's public key can send the user a message encrypted with that key and can be sure that only the user—who alone has the private key—can decrypt it. This provides confidentiality.

The user might also encrypt a message with his private key. This cannot provide confidentiality, because anyone who knows the public key can decrypt it. But the fact that they can decrypt it means the message must have come from the user—who alone has the private key. This provides integrity and authentication and can also be used as a basis for non-repudiation—the digital equivalent of a signature.

If a sender signs a message with her own private key and then encrypts authentication and non-repudiation are provided together.

In practice, things are actually more complex. In the first example, for performance and operational reasons, the sender will choose a random symmetric session key and use a symmetric cipher to encrypt the message. The public key will be used to encrypt just the session key. Similarly, in the second example, the user will first "digest" the message he wishes to sign, and encrypt the digest with his private key; the recipient will recompute the digest and compare its value with the value he decrypts from the user. A digest is a mathematical construct with a relatively short fixed length, which is derived from an arbitrarily long message; it has the essential property that it is infeasible, knowing a message and a corresponding digest, to compute another message with the same digest.

All the processing is done by software; the real human users do not really "do" any of this.

It is important to understand that public keys do not actually have to be published to the world. They can be shared as widely or narrowly as business and privacy requirements dictate.

In prior art public keys can be linked together to form a public key infrastructure—a PKI. The links are data structures (or data files) called certificates. Here is how it works:

Alice may decide to register her public key (and identity information) with a Registration Authority (RA). (In this description of prior art, the usual names "Alice" and "Bob" are used to describe the roles of signatory and relying party, respectively.)

Using the information collected by the RA, a Certificate Authority (CA) may then create a computer file containing Alice's public key together with information which identifies Alice and a validity period. The CA signs the file with its own private key, creating a certificate.

A CA's public key may in its turn be certified by another CA; and that CA's certificate will be certified by another and so on until eventually there is a root, that is, an unsigned (or self-signed) public key whose value has to be known some other way.

So starting from a root it is possible to traverse a certificate chain to discover a public key value.

A set of public keys linked in this way form a public key infrastructure. The simplest PKI has a single CA which acts as the root and which signs all the certificates. It is also possible to build a PKI in prior art using cross-certification instead of a hierarchy, but the end result is broadly the same.

Anybody with the right software can be an RA or a CA; whatever the legal or business constraints, there is no technical requirement for an authority to be authorized by anybody.

It is important to understand that the linking of a public key into a PKI does not affect what can be done with the matching private key. Some common misconceptions can be clarified as follows:

A certificate is "used" by a relying party, not by a holder of a private key. The relying party extracts from the certificate the public key to be used for encryption or signature checking.

A certificate is not needed to create a digital signature or to decrypt a received message.

A user does not need to be named in any certificate at all to check someone else's signature or to send them an encrypted message.

Not even an Advanced Electronic Signature (as defined in the EU Electronic Signatures Directive) requires a certificate to exist in respect of the matching public key.

A typical method in which a PKI is implemented in prior art is as follows.

As well as agreeing to look after her private key, Alice applies her ordinary handwritten signature to a paper application form which references "certificate policies" and "certificate practice statements".

Alice then constructs and signs a PKCS#10 object which she sends to her RA. PKCS#10 is an industry standard data format.

The RA checks the contents of the received object against what it knows about Alice and sends a certificate request to a CA.

The CA signs, and sends to Alice, a certificate upon which any Bob in the world can rely. The certificate will probably have an expiry date a year or so in the future. Alice might have to remember to take action to renew the certificate when it expires, perhaps again using a handwritten signature for that purpose.

When Alice digitally signs anything, her software sends the certificate to the relying party along with her signature block and the object that has been signed.

When Bob receives the transmission, he (that is, his software) first examines the certificate, and checks that it is within its period of validity. If he recognises the "issuer", and knows the issuer's public key, he can also check the signature on the certificate. If it computes, he can extract the public key from the certificate and check the signature on the data that was signed.

Except, of course, that he might not know the public key of the issuer. He now needs a chain of certificates which link to a public key that he does know. Perhaps Alice sent him the chain, or perhaps he has to search public directories to assemble it himself. He may or may not have to pay a charge to access a directory. Bob needs to process the chain by checking that the issuer name in one certificate is the same as the subject name in the next, that all the signatures on all the certificates check out, and that the validity periods within the chain make sense relative to each other. There is a possibility, of course, that no chain can be constructed which includes both the original certificate and a certificate signed by any public key he knows implicitly.

Except, of course, that the original certificate, or any of the certificates in the chain, may have been revoked. So Bob's software must now go in turn to an Internet address (URL—Uniform Resource Locator) included in each certificate, extract the most recent certificate revocation list (CRL) from that URL, and check that the serial number of the next certificate in the chain does not appear. He may or may not have to pay a charge for access to each CRL.

As an alternative to the last three bullets, Bob can instead pass the certificate to a validation authority (VA) which will do much of the work for him, and return to him a signed go/no-go response on the validity of the original certificate. If validation services are sufficiently integrated, they may be able to succeed more often than Bob alone could. Use of a validation service will probably be chargeable.

Bob archives the certificate of interest and either the rest of the chain and the CRLs or the signed validation response. To guard against later revocation of Alice's certificate, Bob would also do well to get from a timestamp authority a timestamp of the signature block on the signed data to prove that he had it in his possession before the revocation occurred.

Ever since the invention of public key cryptography, the vision has been held out of a universal infrastructure that would enable everyone in the world to verify with assurance the digital signatures of everyone else. Electronic transactions exploiting this infrastructure would acquire the important properties of integrity and non-repudiation.

Achievement of the vision would empower individuals because they could digitally sign anything, anywhere, any time. And it would consequently deliver business competitiveness—a typical company, already participating in one e-marketplace as a buyer perhaps, could smoothly enter another, perhaps as a seller, with the same identity. This vision has the potential to alter the nature—and the economics—of the e-marketplace concept. The whole world could develop rapidly into a single e-marketplace—an integrated e-economy.

The prior art does not easily enable subjects to participate in a public key infrastructure with an ability to sign anything, anywhere. Key-pairs in the prior art are generally seen as part of a "managed identity" rather than an extension of personality, independent of certification.

The prior art PKI is largely relevant only in a managed identity context in which a subject is related directly with a single affiliate and the identity only makes sense within that context. For example, an affiliation as an employee, as a customer of a bank, or as a vendor to a major corporation etc. Having acquired or generated a key-pair, the subject convinces a single business partner (a bank, for example, or an employer, or a major customer) of the binding of the subject's identity to its public key. Any particular individual would be likely to have multiple managed identities outstanding at any one time.

A further major problem with the prior art in delivering the universal infrastructure vision is that the CA's contract is typically with the subject and not with the relying party. There is a realization among traditional CA businesses that the subject will be unwilling to pay the full cost—or perhaps any part of the cost—of "being issued with a certificate".

There is a furthermore a perverse liability issue which arises from the fact that the CA's contract is with Alice—the subject named in the certificate—and not with Bob—who relies on its correctness. In prior art PKI any per-certificate liability is unbounded, because whoever signed the certificate never gets to know who is relying on it until there is a problem. Alice can send the same certificate to a million Bobs and the CA will never know how much liability is building up. The "value" of a certificate can be reused and reused without the CA (the source of that value) ever becoming aware.

Directive 1999/93/EC of the European Parliament and of the Council of 13 Dec. 1999 on a Community framework for electronic signatures ("the Directive") defines a number of the terms used in the present document. However, the definition of "certificate" is wider in the present document than in the Directive; the Directive's use of this word corresponds to the use in the present document of the term "verification certificate". The term "digital signature" in the present document is a technique for implementing the Directive's notion of an "advanced electronic signature".

SUMMARY OF THE INVENTION

According to a first aspect of the present invention there is provided a method for supply of data relating to a described entity to a relying entity comprising: generating a first digital certificate signed with an electronic signature by a first signing entity and including: one or more attributes of the described entity; one or more attributes of the first digital certificate which include one or more attributes identifying the first signing entity; an indication of data relating to the described entity which is to be supplied; an indication of one or more sources for the data to be supplied; and one or more attributes identifying one or more relying entities to which the data is to be supplied; the relying entity forwarding the first digital certificate for processing; a source supplying the data indicated in the first digital certificate.

The first digital certificate empowers the relying entity to gain access to the personal data of the described entity which may be held by a source in a data store and may be referred to in this document as an empowerment certificate. The described entity and the relying entity may be individuals, groups of individuals, individuals in a particular role, corporations, organizations, computer applications or systems, automated machines, etc.

Electronic signatures are defined in the Directive as data in electronic form which is attached to or logically associated with other electronic data and which serves as a method of authentication.

The first digital certificate may include any data which the relying entity has previously requested to be included such as a reference, nonce or other data.

A source can hold data or can refer to one or more data sources.

The first digital certificate may be sent with an object signed with a digital signature, but could also be sent on its own. The signing entity of the first digital certificate may be the described entity such that the first digital certificate is a form of self-signed certificate. If an object signed with a digital signature is sent with the first digital certificate, the digital signature and the electronic signature in the first digital certificate may use different key pairs for signing.

The data relating to the described entity may include one or more public keys corresponding to private keys controlled by the described entity.

The data relating to the described entity may be supplied by means of a second digital certificate to the relying entity, the second digital certificate signed with an electronic signature by a second signing entity and including: one or more attributes of a described entity including the data which is to be supplied; one or more attributes of the second digital certificate which include one or more attributes identifying the second signing entity; and one or more attributes identifying one or more relying entities to which the data is to be supplied.

The second digital certificate may be referred to in this document as a custom certificate. The first and second digital certificates may be in the format prescribed by international and industry standards for certificates with the electronic signature using public key cryptography. The first and second digital certificates may include attributes which are sufficient to identify the described entity as well as the relying entity. These may be a single attribute or a combination of more than one attribute. For example, a name may not be sufficient to identify uniquely an entity, whereas a combination of a name, a date of birth and an address will often uniquely identify the entity.

The first digital certificate may authorize the relying entity to use the first digital certificate to obtain a second digital certificate. The relying entity may be authorized to obtain a second digital certificate which is marked as qualified. "Qualified certificates" are defined in the Directive.

The second digital certificate may include one or more attributes of the first digital certificate. At least some of the contents of the first digital certificate may be copied to the second digital certificate.

The method may include the relying entity forwarding the first digital certificate to an intermediate entity to obtain data from a source. The intermediate entity may provide a service for the relying entity and may provide insurance and take financial liability for the supply of the data from the source. The intermediate entity may generate the second digital certificate.

The second digital certificate may include one or more attributes identifying the relying entity which are different from the one or more attributes identifying the relying entity included in the first digital certificate.

The second digital certificate may include one or more attributes identifying the described entity which are different from the one or more attributes identifying the described entity included in the first digital certificate.

The described entity may generate a digital signature using a private key with a corresponding public key and the first signing entity may include the digital signature or a cryptographic digest thereof in the first digital certificate and the data to be supplied to the relying entity may include the public key. A cryptographic digest may be obtained using a hash function. Once the indicated data, including the public key, is received by the relying entity from the source, the digital signature can be verified.

The first digital certificate and the second digital certificate may include a period of validity. The period of validity of the first digital certificate or the second digital certificate may be that short period of time during which a digital signature was generated. For example, this may be 1 or 2 seconds. A digital certificate can be generated with a validity period which begins prior to the generation of the digital certificate. The period of validity may be in the past, prior to the generation of the digital certificate, or in the future or for a period spanning the past and the future.

The data indicated in the first digital certificate may include confirmation of a payment or a debt due from the described entity identified in the first digital certificate to the relying entity identified in the first digital certificate. A second signing entity may indicate in a second digital certificate a guarantee of a debt indicated as due in a first digital certificate.

A change in previously supplied data may be indicated by the supply of a list identifying a second digital certificate relating to the previously supplied data. A list may identify a first or second digital certificate specifying data which is no longer authorized to be supplied to the relying entity. The generation of the list may include one or more attributes identifying relying entities to which the list relates. The list may be a certificate revocation list.

The method may include generating and storing a list for the second digital certificates, which is indexed by one or more attributes identifying relying entities such that all second digital certificates in the list relevant to a relying entity can be identified.

According to a second aspect of the present invention there is provided a system for supply of data relating to a described entity to a relying entity, the system comprising: a first signing entity application, a relying entity application and a data store wherein the data store holds data relating to the described entity; the first signing entity application has means for generating a first digital certificate signed with an electronic signature by the first signing entity application and including: one or more attributes of the described entity; one or more attributes of the first digital certificate which include one or more attributes identifying the first signing entity; an indication of data relating to the described entity which is to be supplied; an indication of one or more sources for the data to be supplied; and one or more attributes identifying one or more relying entities to which the data is to be supplied; the relying entity application has means for forwarding the first digital certificate for processing; and means for supplying the data indicated in the first digital certificate from the data store.

The system may be provided using a secure messaging system across a network, for example the Internet. The described entity and the relying entity may use software applications to generate and sign messages and certificates. The data to be supplied may be held in a data store by a source and the data store may be an electronic database. A source may hold the data store or may refer to one or more further sources. The first signing entity may be the described entity.

The system may include more than one data store holding data relating to the described entity.

The first digital certificate may include any data which the relying entity has previously requested to be included such as a reference, nonce or other data.

A second digital certificate may be provided for supplying the data relating to the described entity to the relying entity application, the second digital certificate signed with an electronic signature by a second signing entity application and including: one or more attributes of the described entity including the data which is to be supplied; one or more attributes of the second digital certificate which include one or more attributes identifying the second signing entity; and one or more attributes identifying one or more relying entities to which the data is to be supplied.

The first digital certificate may authorize the relying entity to use the first digital certificate to obtain a second digital certificate. The relying entity may be authorized to obtain a second digital certificate which is marked as qualified. The second digital certificate may include one or more attributes of the first digital certificate. At least some of the contents of the first digital certificate may be copied to the second digital certificate.

The system may include an intermediate entity application to which the relying entity application forwards the digital certificate to obtain data from the data store. The intermediate entity may use a software application to act between the relying entity and a source. An intermediate entity application may generate the second digital certificate.

The second digital certificate may include one or more attributes identifying the relying entity which are different from the one or more attributes identifying the relying entity included in the first digital certificate.

The second digital certificate may include one or more attributes identifying the described entity which are different from the one or more attributes identifying the described entity included in the first digital certificate.

The described entity may generate a digital signature using a private key with a corresponding public key and the first signing entity may include the digital signature or a cryptographic digest thereof in the first digital certificate and the data to be supplied to the relying entity may include the public key. A cryptographic digest may be obtained using a hash function. Once the indicated data, including the public key, is received by the relying entity from the source, the digital signature can be verified.

The first digital certificate and the second digital certificate may include a period of validity. The period of validity of the first digital certificate or the second digital certificate may be that short period of time during-which a digital signature was generated. A digital certificate can be generated with a validity period which begins prior to the generation of the digital certificate. The period of validity may be in the past, prior to the generation of the digital certificate, or in the future or for a period spanning the past and the future.

The data indicated in the first digital certificate may include confirmation of a payment or a debt due from the described entity identified in the first digital certificate to the relying entity identified in the first digital certificate. A second signing entity may indicate in a second digital certificate a guarantee of a debt indicated as due in a first digital certificate.

A change in previously supplied data may be indicated by the supply of a list identifying a second digital certificate relating to the previously supplied data. A list may identify a first or second digital certificate specifying data which is no longer authorized to be supplied to the relying entity. The generation of the list may include one or more attributes identifying relying entities to which the list relates. The list may be a certificate revocation list.

The data store may have a means of determining for an item of data included in the data store information concerning or contained in a first digital certificate which has referenced that item, or information concerning or contained in a second digital certificate which provides the value of that item. The certificate lists just described may be generated through this means.

The intermediate entity application may include a storage means for storing second digital certificates referenced by the relying entities identified in the second digital certificates.

The system may include a proxy entity application to which the relying entity application or the intermediate entity application may forward the first digital certificate to obtain information specifying to which data store or other proxy entity application the first certificate should next be forwarded.

According to a third aspect of the present invention there is provided a computer program product stored on a computer readable storage medium, comprising computer readable program code means for performing the steps of: generating a digital certificate signed with an electronic signature by a signing entity and including: one or more attributes of a described entity; one or more attributes of the digital certificate which include one or more attributes identifying the signing entity; either an indication of data relating to the described entity which is to be supplied and an indication of one or more sources or the data itself; and one or more attributes identifying one or more relying entities to which the data is to be supplied.

A computer program product may be provided with one or more of the features of the first and second aspects of the present invention.

According to a fourth aspect of the present invention there is provided a digital certificate signed with an electronic signature by a signing entity and comprising: one or more attributes of a described entity; one or more attributes of the digital certificate which include one or more attributes identifying the signing entity; either an indication of data relating to the described entity which is to be supplied and an indication of one or more sources or the data itself; and one or more attributes identifying one or more relying entities, wherein the relying entities are entities to which the data relating to the described entity is to be supplied.

The digital certificate identifying the relying entity may be authorizing the relying entity to obtain the indicated data relating to the described entity or may be supplying the data itself to the relying entity.

The digital certificate may be provided with one or more of the features of the first and second aspects of the present invention.

According to a fifth aspect of the present invention there is provided a method of providing a digital signature based on a digital certificate comprising: generating a digital signature using a private key corresponding to a public key, the signed data including: one or more attributes identifying a digital certificate to be generated; generating a digital certificate signed with an electronic signature by a signing entity and including: one or more attributes of a described entity which are sufficient to obtain the public key; one or more attributes of the digital certificate which include one or more attributes identifying the signing entity; and an indicated period of validity of the digital certificate which begins earlier than the time of generation of the digital certificate; wherein the digital certificate is generated after the generation of the digital signature.

An object may be signed with a digital signature which forward references a digital certificate which has not yet been generated and then a digital certificate may be generated which references back to the digital signature and has a period of validity which includes the time of the generation of the digital signature.

More than one digital signature may be generated which identifies the same digital certificate. The signing entity may be the described entity.

The period of validity of the digital certificate may be that short period in which the digital signature was generated.

The one or more attributes identifying the digital certificate to be generated given in the digital signature may include a serial number. The lowest available serial number which can be used for the next digital certificate to be generated or the last used serial number using each private key may be recorded.

According to a sixth aspect of the present invention there is provided a system for providing a digital signature based on a digital certificate, the system comprising:

a described entity application with means for generating a digital signature using a private key corresponding to a public key, the signed data including: one or more attributes identifying a digital certificate to be generated; a signing entity application having means for generating a digital certificate with an electronic signature and including: one or more attributes of a described entity which are sufficient to obtain the public key; one or more attributes of the digital certificate which include one or more attributes identifying the signing entity; and an indicated period of validity of the digital certificate which begins earlier than the time of generation of the digital certificate; wherein the digital certificate is generated after the generation of the digital signature.

A system may be provided with one or more of the features of the fifth aspect of the present invention.

According to a seventh aspect of the present invention there is provided a computer program product stored on a computer readable storage medium, comprising computer readable program code means for performing the steps of: generating a digital signature using a private key corresponding to a public key, the signed data including: one or more attributes identifying a digital certificate to be generated; generating a digital certificate signed with an electronic signature by a signing entity and including: one or more attributes of a described entity which are sufficient to obtain the public key; one or more attributes of the digital certificate which include one or more attributes identifying the signing entity; and an indicated period of validity of the digital certificate which begins earlier than the time of generation of the digital certificate; wherein the digital certificate is generated after the generation of the digital signature.

A computer program product may be provided with one or more of the features of the fifth aspect of the present invention.

According to a eighth aspect of the present invention there is provided a digital certificate signed with an electronic signature by a signing entity and comprising: one or more attributes of a described entity; one or more attributes of the digital certificate which include one or more attributes identifying the signing entity; and an indicated period of validity of the digital certificate which begins earlier than the time of generation of the digital certificate.

The indicated period of validity of the digital certificate may end no later than the time of generation of the digital certificate such that the period of validity of the digital certificate is all in the past. Alternatively, the period of validity may extend from the past to a future time.

The described entity may be the signing entity such that the digital signature is a form of self-signed certificate. The electronic signature may use public key cryptography. The digital certificate may include a time stamp indicating the time of generation.

According to a ninth aspect of the present invention there is provided a digital signature using a private key corresponding to the public key derived from a digital certificate as defined in the eighth aspect of the present invention, wherein the digital certificate is generated after the generation of the digital signature, the signed data including: one or more attributes identifying the digital certificate to be generated.

It is a further aim of an aspect of the present invention to provide a method and system to assign ownership of electronic property such that the ownership is safeguarded and can be proved by automated means.

According to a tenth aspect of the present invention there is provided a system for transfer of ownership of electronic property, comprising: an electronic property signed with an electronic signature by a first entity; a digital certificate generated and signed with an electronic signature by the first entity, the digital certificate including an indication of a second entity to which the electronic property is transferred, and an indication of data which is to be supplied to the second entity from a source or the data itself, wherein the electronic property and the digital certificate include a link means connecting the electronic property with the digital certificate.

The term "digital certificate" should be interpreted in a broad sense as any data structure which is used to contain information and which may be signed. The data structure may be, for example, an X509v.3 certificate, an XML structure or a combination of the two.

The link means may be a bit-stream generated from a serial number of the digital certificate and an identifier referencing the transfer, the bit-stream being included in the electronic property and the bit-stream or an indication of it being included in the digital certificate. Alternatively, the link means may be a digital watermark with a watermark key, wherein the watermark is included in the electronic property and the watermark key or an indication of it is included in the digital certificate.

The electronic property may be signed by the first entity using a private key of a public/private key pair and the corresponding public key or an indication of it is provided in the digital certificate.

The electronic property may be encrypted by the first entity using the public key of a public/private key pair of the second entity. The electronic property may be encrypted by the first entity using a symmetrical cipher with a session key and the session key is encrypted using the public key of a private/public key pair of the second entity.

The digital certificate may have a validity period which begins earlier than the time of generation of the digital certificate.

The digital certificate may have a second validity period relating to the period for the duration of which the rights in the electronic property are transferred.

A second digital certificate may be provided, signed with an electronic signature by a third entity and including: an indication of the first entity; an indication of the second entity; an indication of the third entity; and data to be supplied. The data to be supplied may include the public key of a private/public key pair of the first entity.

The transfer of electronic property may be tracked by each entity having an account identified by the electronic property, an account being incremented or decreased by a unit upon transfer of the electronic property. The account may be identified by a hash of the electronic property.

According to an eleventh aspect of the present invention there is provided a method for transfer of ownership of electronic property from a first entity to a second entity, comprising: the first entity signing an electronic property with an electronic signature; generating a digital certificate signed with an electronic signature by the first entity and including an indication of the second entity and an indication of data which is to be supplied to the second entity from a source or the data itself, wherein the electronic property and the digital certificate include a link means connecting the electronic property with the digital certificate.

The method may include the first entity sending the electronic property and the digital certificate to the second entity.

The link means may be a bit-stream generated from a serial-number of the digital certificate and an identifier referencing the transfer, the bit-stream being included in the electronic property and the bit-stream or an indication of it being included in the digital certificate. Alternatively, the link means is a digital watermark with a watermark key, wherein the watermark is included in the electronic property and the watermark key or an indication of it is included in the digital certificate.

The method may include the first entity signing the electronic property using a private key of a public/private key pair and the corresponding public key or an indication of it is provided in the digital certificate. The method may include the first entity encrypting the electronic property using the public key of a public/private key pair of the second entity. The method may include the first entity encrypting the electronic property using a symmetrical cipher with a session key and encrypting the session key with the public key of a private/public key pair of the second entity.

The digital certificate may have a validity period which begins earlier than the time of generation of the digital certificate.

The digital certificate may have a second validity period relating to the period for the duration of which the rights in the electronic property are transferred.

The method may include the second entity obtaining a second digital certificate, signed with an electronic signature by a third entity and including: an indication of the first entity; an indication of the second entity; an indication of the third entity; and data to be supplied. The data to be supplied may include the public key of a private/public key pair of the first entity.

The transfer of electronic property may be tracked by each entity having an account identified by the electronic property, an account being incremented or decreased by a unit upon transfer of the electronic property. The account may be identified by a hash of the electronic property.

According to a twelfth aspect of the present invention there is provided a computer program product stored on a computer readable storage medium comprising computer readable program code means for performing the steps of: the first entity signing an electronic property with an electronic signature; generating a digital certificate signed with an electronic signature by the first entity and including an indication of the second entity and an indication of data which is to be supplied to the second entity from a source or the data itself, wherein the electronic property and the digital certificate include a link means connecting the electronic property with the digital certificate.

It is a further aim of an aspect of the present invention to provide a method and system for electronic voting.

According to a thirteenth aspect of the present invention there is provided a method for electronic voting in which there are an authentication body, a counting body, and a plurality of voters; a voter generates a digital certificate, the digital certificate includes an indication of identification data which is to be supplied to the authentication body to identify the voter uniquely and references to one or more sources for the identification data and/or the digital certificate includes the identification data itself, the digital certificate also includes an indication of a voting key; the voter signs the digital certificate with an electronic signature; the digital certificate is encrypted for reading by the authentication body only; the voter generates a voting message including a vote; the voting message is encrypted for reading by the counting body only; and a signature block is generated combining the digital certificate and the voting message; wherein the encrypted digital certificate, the encrypted voting message and the signature block are sent to the authentication body.

In some voting systems confirmation is required from an external source of the identification data and the digital certificate may include an indication of the identification data and confirmation of the voter's right to vote and references to one or more sources that can provide the identification data and the confirmation. Alternatively, if the voting system permits assertion of the identification by the voter, the digital certificate may include only the identification data itself. Both the identification data and the indication of the identification data and references may be included in the digital certificate.

The identification data may include one or more of: name, address, date of birth, nationality, length of residence, non-membership of prohibited classes of the voter.

The voter may include a nonce in the voting message in the form of an identifier applied by the voter to identify his vote. The voter may include a random spoiler in the voting message.

The digital certificate may be encrypted using the public key of a public/private confidentiality key pair of the authentication body. The voting message may be encrypted using the public key of a public/private confidentiality key pair of the counting body.

An integrity block may be formed by obtaining a digest of the encrypted digital certificate, obtaining a digest of the encrypted voting message and combining the digests. The digests may be combined, a further digest obtained from the combination and the resultant digest may be encrypted. The digest may be encrypted using a private key of a public/private signature key pair that the voter is using for voting to provide the signature block. The voting key may be the public key of the public/private signature key pair that the voter is using for voting.

The authentication body may confirm that the digital certificate and the encrypted voting message are as the voter sent them and are linked by the signature block. The authentication body may decrypt the digital certificate and may obtain the voting key and may use it to decrypt the signature block, the authentication body may also combine the encrypted digital certificate and the encrypted voting message using the same method as the voter and may compare the result with the decrypted signature block.

A serial number for the voter may be issued by the authentication body. The authentication body may construct a message including: the voter's serial number, a digest of the digital certificate, the voting key, the message being encrypted by the authentication body. The authentication body may send the message, the encrypted voting message and the signature block to the counting body.

The counting body may decrypt the message and may use the digest of the encrypted digital certificate and voting key from the message to confirm that the voting message is an unchanged original vote which has been assigned a serial number by the authentication body. The counting body may decrypt and record the voter's vote.

According to a fourteenth aspect of the present invention there is provided a system for electronic voting in which there are an authentication body, a counting body, and a plurality of voters; the system comprising: a digital certificate generated by a voter, the digital certificate includes an indication of identification data which is to be supplied to the authentication body to identify the voter uniquely and references to one or more sources for the identification data and/or the digital certificate includes the identification data itself, the digital certificate also includes an indication of a voting key; the digital certificate being signed with an electronic signature by the voter; the digital certificate being encrypted for reading by the authentication body only; a voting message including a vote generated by the voter; the voting message being encrypted for reading by the counting body only; and a signature block combining the digital certificate and the voting message; wherein the encrypted digital certificate, the encrypted voting message and the signature block are sent to the authentication body.

In some voting systems confirmation is required from an external source of the identification data and the digital certificate may include an indication of the identification data and confirmation of the voter's right to vote and references to one or more sources that can provide the identification data and the confirmation. In other voting systems, the assertion of the identification data by the voter is sufficient and the digital certificate may include only the identification data itself. Both the identification data and the indication of the identification data and references may be included in the digital certificate.

The identification data may include one or more of: name, address, date of birth, nationality, length of residence, non-membership of prohibited classes of the voter.

The digital certificate may be an X.509 v.3 certificate.

The voting message may include a nonce in the form of an identifier applied by the voter to identify his vote. The voting message may include a random spoiler.

The digital certificate may be encrypted using the public key of a public/private confidentiality key pair of the authentication body. The voting message may be encrypted using the public key of a public/private confidentiality key pair of the counting body.

An integrity block may be formed by obtaining a digest of the encrypted digital certificate, obtaining a digest of the encrypted voting message and combining the digests. The digests may be combined, a further digest obtained from the combination and the resultant digest may be encrypted. The digest may be encrypted using a private key of a public/private key pair that the voter is using for voting to provide the signature block. The voting key may be the public key of the public/private signature key pair that the voter is using for voting.

The digital certificate and the encrypted voting message may be confirmed as the voter sent them and may be linked by the signature block. The digital certificate may be decrypted and the voting key may be obtained and used to decrypt the signature block, the encrypted digital certificate and the encrypted voting message may also be combined using the same method as the voter and the result may be compared with the decrypted signature block.

A serial number for the voter may be issued by the authentication body. A message may be constructed by the authentication body including: the voter's serial number, a digest of the digital certificate, the voting key, the message being encrypted by the authentication body. The message, the encrypted voting message and the signature block may be sent by the authentication body to the counting body.

The message may be decrypted by the counting body and the digest of the encrypted digital certificate and the voting key from the message may be used to confirm that the voting message is an unchanged original vote which has been assigned a serial number by the authentication body. The voter's vote may be decrypted and recorded by the counting body.

According to a fifteenth aspect of the present invention there is provided a computer program product stored on a computer readable storage medium comprising computer readable program code means for performing the steps of: generating a digital certificate, the digital certificate includes an indication of identification data which is to be supplied to the authentication body to identify a voter uniquely and references to one or more sources for the identification data and/or the digital certificate includes the identification data itself, the digital certificate also includes an indication of a voting key; signing the digital certificate with an electronic signature by the voter; encrypting the digital certificate for reading by the authentication body only; generating a voting message including a vote; encrypting the voting message for reading by the counting body only; generating a signature block combining the digital certificate and the voting message; sending the encrypted digital certificate, the encrypted voting message and the signature block to the authentication body.

The proposed "empowerment infrastructure" which can be implemented through the invention describes a public key infrastructure (PKI) in the sense that it provides for a relying party to establish the value of a public key matching the private key held by an identified subject, and in the sense that it extends the prior art constructs of PKI, including certificates and certificate revocation lists (CRLs) signed by certificate authorities (CAs). The invention itself relies on public key cryptography, but fundamentally challenges the conventional wisdom about the role of keys and certificates in a workable PKI model.

The empowerment approach that the invention enables goes well beyond the possibilities of PKI prior art to allow a wide range of personal data items—not just public keys—to be certified within a privacy enhancing framework that empowers the subject to control who can access his personal data, and how and when. The invention enables a method of delivering, not just public keys, but any piece of assured personal data. In other words, an architecture for an e-marketplace which brings together the buyers and sellers of personal data. The brokers of this marketplace are the data subjects themselves; no personal data moves in the empowerment infrastructure except with the explicit authorization of the subject to whom that data relates.

The invention also provides a payments mechanism integrated into the personal data framework. Imagine the sale, empowered by Alice, of a piece of personal data of the form "Alice is indeed able to pay you the sum of E100". Usually, when personal data is sold, the database from which it is derived is not altered. But this case has to be an exception, and some database attribute, controlled by the seller of Alice's personal information, has to be altered by exactly—or, where commission or interest are involved, approximately—one hundred. It now just takes a small leap of imagination to see a payment as simply a piece of personal data that changes when it is sold. So the invention also permits a secure payments architecture. By extension, it is also possible to use the infrastructure to confirm a debt due from the signatory to the relying party, and even to indicate a guarantee for such a debt.

Embodiments of the invention are now described, by means of examples only, with reference to the accompanying drawings in which:

BEST MODE FOR CARRYING OUT THE INVENTION

Figure 1:
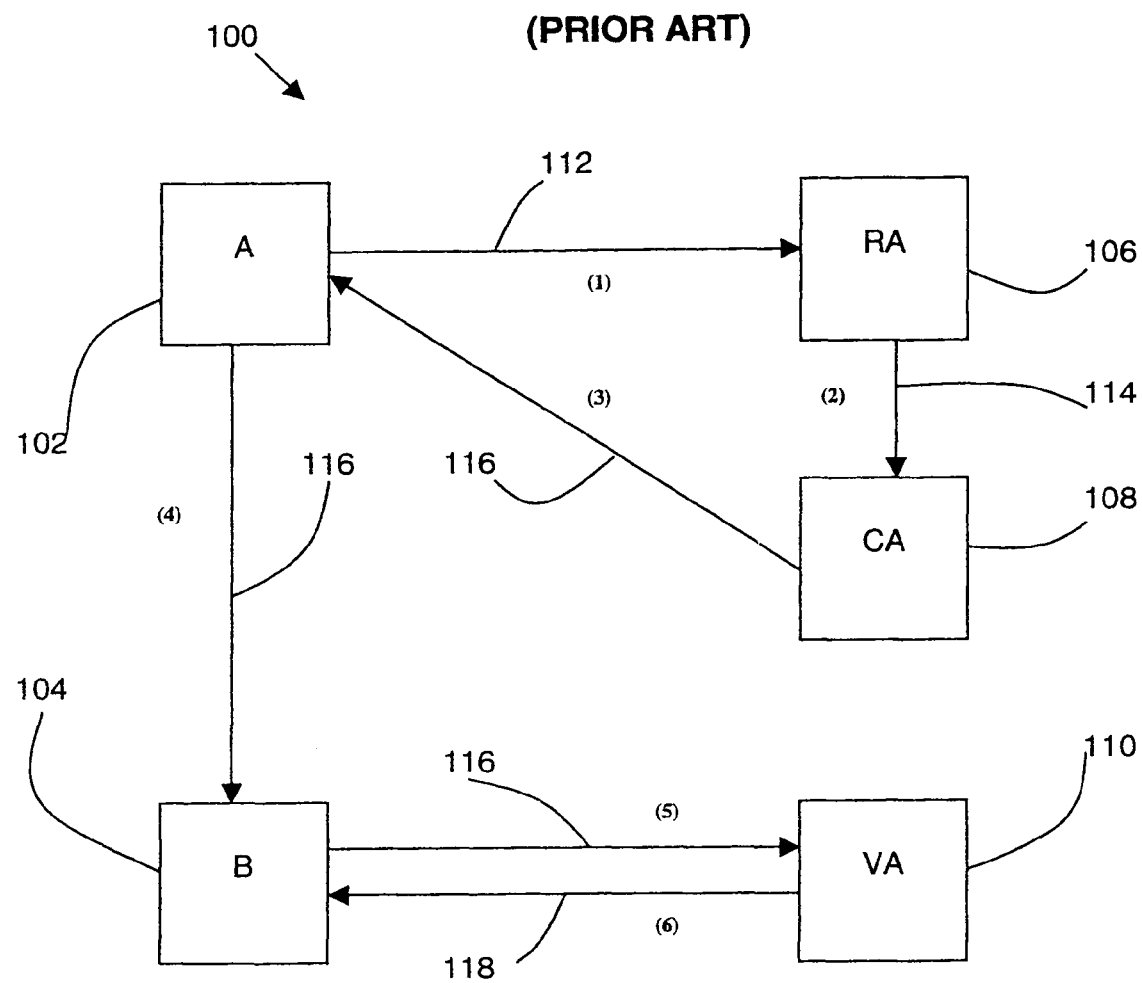
FIG. 1 is a diagram of a system of delivery of data of the prior art.

Referring to FIG. 1, the traditional system of delivery of a data object in the form of a certificate as known from the prior art is shown. FIG. 1 shows a first user of the system, Alice 102, and a second user, Bob 104. There are also provided a registration authority (RA) 106, a certification authority (CA) 108 and a validation authority (VA) 110.

In the prior art system, the data object to be delivered is a certificate for use in public key cryptography. In public key cryptography, a public key certificate associates a public key value with the certificate's subject. The certificate's subject is a particular person, role, device or other entity that controls the corresponding private key.

A public key certificate is digitally signed by a person or entity called a certification authority.

A registration authority (RA) traditionally manages interactions between a certification authority (CA) and its subscribers or certificate applicants. There may be multiple RAs for a CA. The issuance of a certificate may involve a personal presence for verifying the applicant's identity through presentation of identifying documents. The RA does not itself issue the certificates but may validate, approve or reject certificate applications.

In prior art, the method of delivering a certificate starts with Alice's self-signed token (PKCS#10) 112. PKCS#10 defines a format for a message to request the issuance of a certificate from a CA. The PKCS#10 token 112 allows the requesting entity, Alice 102, to supply her public key and other values requested for inclusion in the certificate. Alice 102 sends the token 112 to the RA 106, which converts it to a certificate request 114. The certificate request is sent by the RA to the CA 108. The CA 108 converts it to a certificate 116 which it sends to Alice 102. Alice 102 sends the certificate 116 unchanged to Bob 104. Bob then sends the certificate unchanged to a validation authority (VA) 110, which converts it to a validation response 118 to Bob 104. FIG. 1 shows the order of these actions in numbers given in parentheses.

Figure 2:
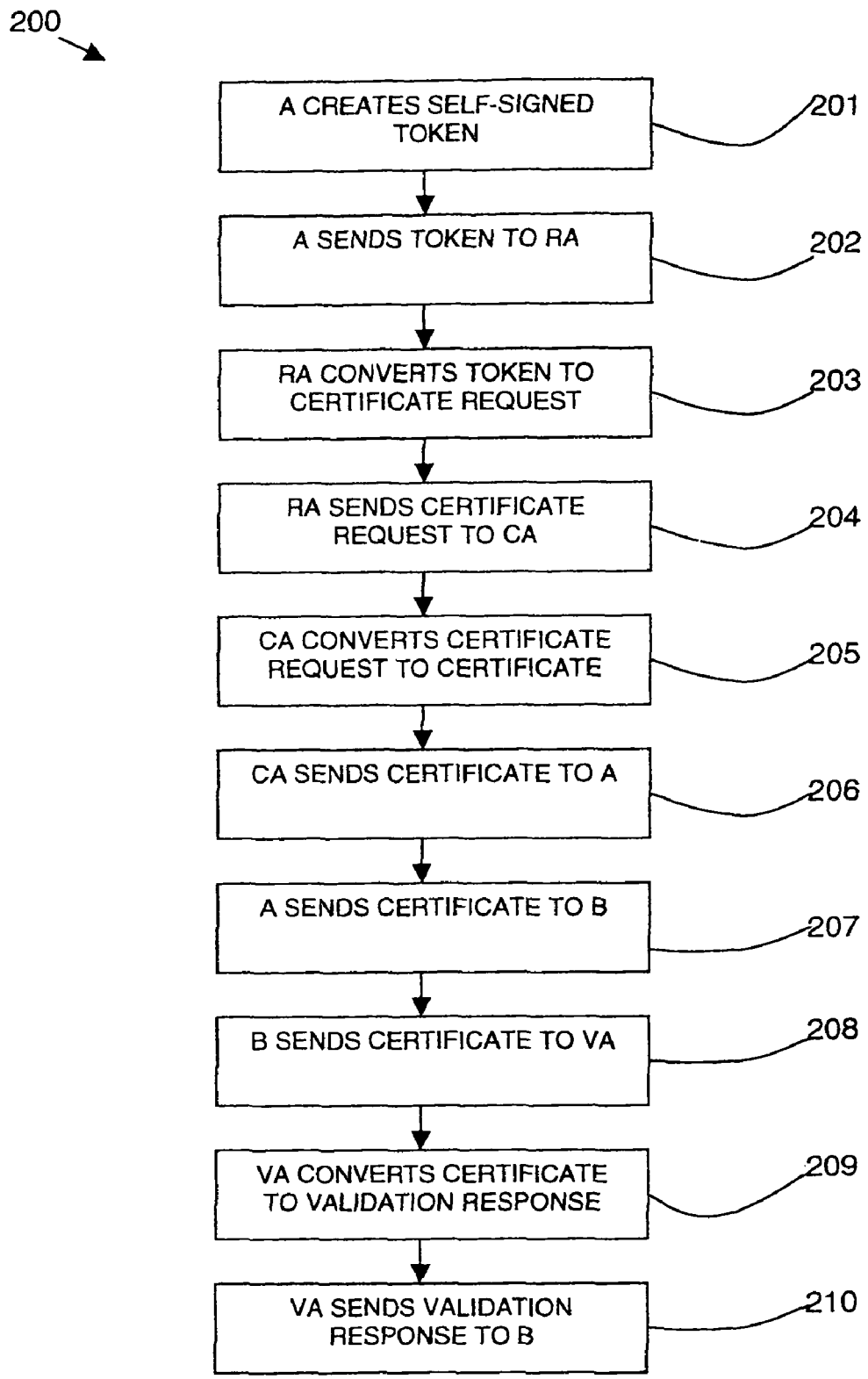
FIG. 2 is a flow diagram of the system of FIG. 1.

FIG. 2 shows a flow diagram of the traditional system 200 of the prior art described above. Alice creates a self-signed token in the first step 201 and sends this 202 to an RA. The RA converts the token to a certificate request 203 and sends 204 the certificate request to a CA. The CA converts the certificate request to a certificate 205 and sends 206 the certificate to Alice. Alice sends 207 the certificate to Bob. Bob need to have the certificate validated so he sends the certificate to a VA 208. The VA converts 209 the certificate to a validation response either confirming or denying that the certificate is valid. The validation response is sent by the VA to Bob 210.

Figure 3:
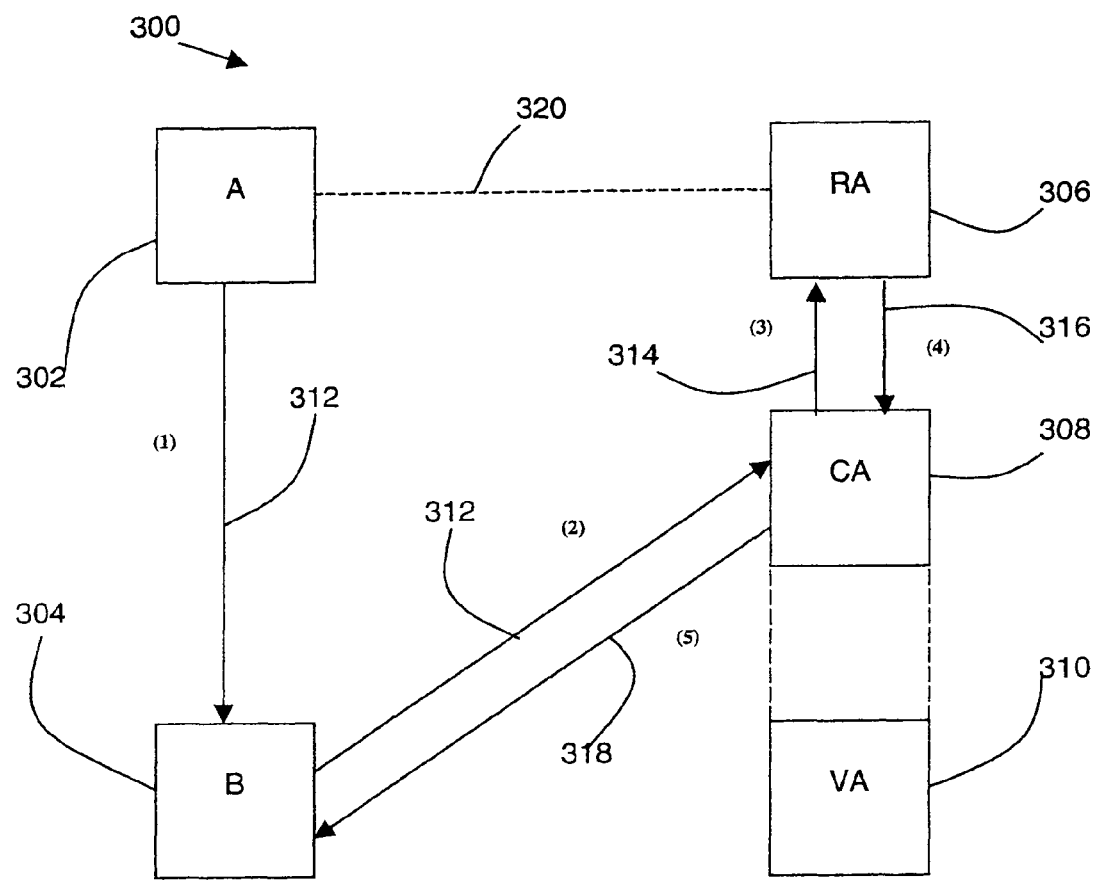
FIG. 3 is a diagram of a system of delivery of data in accordance with the present invention.

In a described embodiment of the present invention, a method and system are referred to as an empowerment method or system. This system is shown in FIG. 3 using the same structure as FIG. 1 for comparison purposes. The embodiment is described in terms of delivery of a certificate for use in public key cryptography; however, as will become evident, the present invention is not restricted to the delivery of certificates only for this particular use. Alice 302 is a described entity and Bob 304 is a relying entity.

Referring to FIG. 3, Alice 302 has previously registered 320 with an RA 306 and the RA 306 has information about Alice 302. Alice 302 sends a self-signed token 312 to Bob 304. Bob 304 sends the token 312 unchanged to a CA 308. The CA 308 converts the token to a request 314 to one (or more) RAs 306. The RA 306 converts the request to a response 316 to the CA 308. The CA 308 converts it to a pre-validated certificate 318 which it sends to Bob 304. As the certificate is pre-validated, Bob 304 does not need the explicit services of a VA to validate the certificate. The functions of the VA 310 are combined with the CA 308. FIG. 3 shows the order of these actions by numbers in parentheses.

Figure 4:
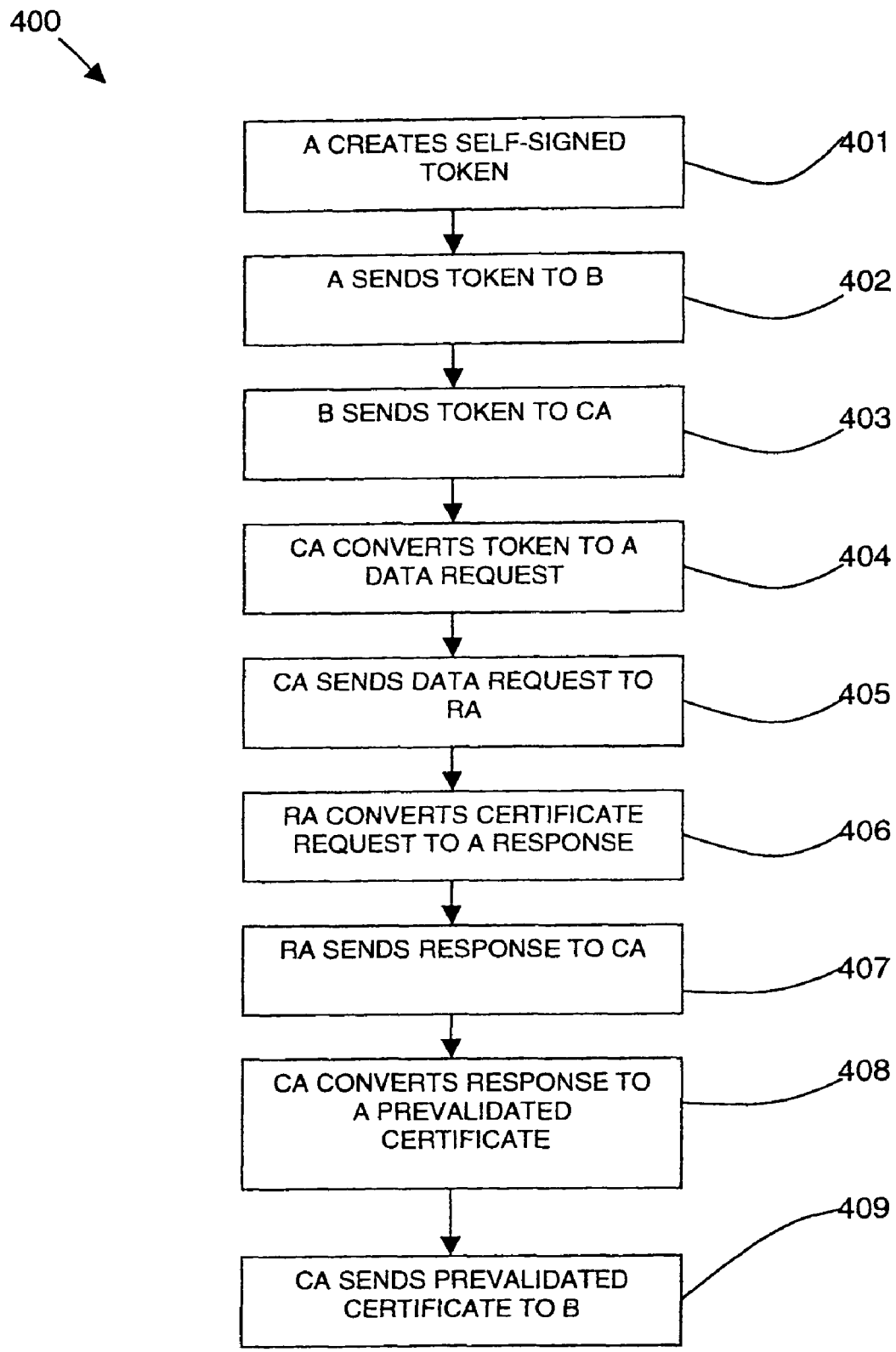
FIG. 4 is a flow diagram of the overall system of FIG. 3.

The method 400 of the described embodiment is shown in a flow diagram in FIG. 4. In the first step 401 Alice creates a self-signed token. Alice sends 402 the token to Bob. Bob sends 403 the token to a CA. The CA converts 404 the token to a data request and sends 405 the request to a RA. The RA converts 406 the request to a response and sends 407 the response to the CA. The CA converts 408 the response to a pre-validated certificate and sends 409 the pre-validated certificate to Bob.

The traditional system of the prior art and the described embodiment of the system both execute three conversions. Both systems start with Alice self-signing a token and end with Bob possessing a validated certificate naming Alice as subject. But the Alice-to-Bob portion is the first of five steps in the empowerment system of the described embodiment and the fourth of six steps in the traditional system.

This difference of sequence turns out to have far-reaching consequences. In the empowerment system 300, Alice 302 can choose at the granularity of each transaction which of her identities (as employee, taxpayer, bank customer, pseudonym, . . . ) to assert and which of her attributes (items of personal data) to empower her RA 306—or RAs—to disclose. Since Bob 304 is now in the customer role with the CA 308, the certificate policy reflects what he is willing to pay, enabling an improved PKI business model in which liabilities are understood and controlled. Because there is no requirement for a certificate to exist before Alice makes her first ever signature, she can sign her RA agreement digitally rather than in handwritten form.

The empowerment system 300 shifts mindset away from the notion of a certificate as part of a managed identity towards a mechanism through which a data subject (Alice 302) empowers an RA to reveal validated personal data to a relying party (Bob 304). A public key value becomes just another piece of validated personal data delivered through this process.

The empowerment system of the described embodiment is now considered in more detail.

The Database

The described embodiment of the empowerment system assumes that personal data is held in databases at one or more sources. (The term database is taken to include directories.) Databases model what is going on in the real world. A change in a database reflects a change in the real world. The embodiment only applies to those database entries which identify the subject—that is, where there is sufficient information in the entry to distinguish the subject from all other subjects in that database. There is no requirement that databases must be digital—hardcopy databases are included.

Generally, there can be expected to be more than one way to identify a subject. The following is an imagined extract from Alice Earthling's entry in the personnel database of her employer Acme SA:

| | |
|---|---|
| Name | Alice Earthling |
| Date of birth | 19631117 |
| Home address | 65 Southview Road |
| Employee number | 65193 |
| Alice's unique number at the Internal Revenue Service (Acme hold this information to pay withholding tax) | DF456781A |
| Alice's banker | Rutland Bank |
| Alice's bank account number (Acme hold this information in order to pay Alice each month) | 01081208 |
| Alice's work e-mail address | alice.earthling@acme.com |
| Alice's home e-mail address | Alice@earthling.name |
| Alice's work phone number | +99 12 3000 3274 |
| Alice's cellphone number | +99 73 0578 2407 |
| Alice's home phone number | +99 13 2553 8109 |
| Alice's registered domain name | alice.earthling.name |
| The value of the public key matching the private key under Alice's control | 956DF57E4... |
| A JPEG file containing a full face photograph of Alice | AD53827D5C88E575EAB6678... |
| A TIFF file containing a digitised image of Alice's handwritten signature | FE4368AB543C55FDE653FB6... |
| A pseudonym | 756384928475 |
| Alice's salary | €60,500 |
| Alice's external purchasing limit at Acme | €100,000 |

The data in the database entry for Alice Earthling includes attributes which provide identification, authentication, location and authorization. Note that a pseudonym is permitted as an identifier.

As the Alice/Acme example includes several data items, it is possible to take several views of the entry, each with a different identifier. So for each view there is a primary identifier and a predicate. The predicate contains all the attributes of the entry except those in the primary identifier which characterize the view. It might be necessary to use a combination of attributes (for example, bank and account number) to construct a single primary identifier, or a single attribute (for example, personnel number) might suffice. In the example, Alice's salary will always be part of the predicate. Her work e-mail address will be part of the predicate in all views except one, namely the view which has her work e-mail address as the primary identifier.

Note that the possibility of the public key value being a primary identifier is allowed for—making the practical assumption that the same key pair will never be generated twice.

This description is for the general case. The system also allows for the simpler case of an entry which has only one possible view because it has only one attribute or set of attributes that could be a primary identifier.

Databases of the form just described already exist pervasively throughout the world in government departments and agencies, large corporations and most other sorts of organization.

The Certificate

One way of storing data about individuals is in the form of certificates. In the described embodiment, in respect of individuals, a certificate can be seen as a digitally signed extract of an entry in a database. This can be extended further to include certificates relating to entities that are not individuals. In the described system, certificates are the mechanism through which entries become visible outside the organization operating each database.

A certificate in the described embodiment must contain information from a single view of a single entry. As will be described later, it may also contain other information. This is a crucial difference between a certificate and a database entry. A database entry sits there with all views equally possible. In a certificate, the identifier is committed to a single view.

A certificate must contain the full primary identifier relating to the selected view. The identifier in a certificate is called the "distinguished name". A certificate may also contain information from the predicate of the selected view, either the whole predicate or any sensible subset of it. There is little value in a certificate that contains only a distinguished name.

In particular, the predicate information may contain authenticators (including, public key values), locators, authorizers and non-primary identifiers.

Where one or more non-primary identifiers are included, they may be useful as a redundancy checking mechanism. For example, in a certificate which has a bank account number as the primary identifier, one or more of the other identifiers (common name, say) can be used by the bank to double-check against mis-identification.

A traditional certificate known from the prior art identifies a subject or described entity but does not identify any particular relying party or entity. A relying entity is a user of a certificate, that is, someone who relies on the accuracy of the contents of the certificate.

The model's taxonomy then develops as follows:

A certificate containing as authenticator a public key which matches a private key used for creating digital signatures is classed as a verification certificate.

Verification certificates are either issued to the public, or not, and either qualified or not. The difference is important because the European Union Electronic Signatures Directive treats each class differently.

The model assigns certificates to one of three further classes. The classes are traditional, empowerment and custom. Further information on these classes appear later, but in summary:

A traditional certificate identifies a subject but does not identify any particular relying party. A relying party is a user of a certificate, that is, someone who relies on the accuracy of the contents of the certificate. This class of certificate is found extensively in prior art.

A custom certificate identifies both a relying party and a subject, and the entity who signs the certificate is not the subject of the certificate.

An empowerment certificate identifies both a relying party and a subject, and is signed by the subject.

Empowerment and custom certificates are either instantaneous or long term. (Traditional certificates are always long term.) The period of validity of an instantaneous certificate is short enough to practically prevent more than one signature being created in that time with the same private key. It is possible to create many such signatures with the same private key during the period of validity of a long term certificate.

In the model all empowerment and custom verification certificates are classed as issued to the public. In the model custom certificates can be either qualified or unqualified while empowerment certificates can never be qualified.

The Registration Authority

The traditional notion of a registration authority (RA) persists in the described system in the form of sources for data to be supplied. In the embodiment, the registration authority for a given subject is defined as:

The controller of a database . . .

who has agreed with the subject to become an RA in respect of the subject . . .

and includes in its database entry for the subject the value of the subject's public verification key.

In respect of a given subject, an RA is either a direct RA (DRA) or an indirect RA (IRA). The difference is as follows:

A direct RA holds the value of the subject's public key as primary data, updating it in accordance with events in the real world. To achieve this, a DRA probably has some sort of contract with the subject to cover notification in the case of loss or compromise of the corresponding private key.

An indirect RA has cached a longterm custom certificate which contains the value of the public key, and has access to a current certificate revocation list (CRL) which enables the continuing validity of such a certificate to be checked. (CRLs are explained further below.)

The same organization might be a DRA in respect of one subject and an IRA in respect of another.

No subject can have an IRA without also having at least one DRA, although it is possible for a subject to have a DRA and no IRAs. This is because there must be somewhere in the infrastructure where the public key value is bootstrapped. Unless a subject had a DRA in the first place, there could be no longterm custom certificates for any IRA to cache. If a subject stopped having a relationship with its last DRA, then it is likely that all the relevant longterm custom certificates would very soon appear in the CRLs which the IRAs check, so very quickly the subject would cease to have any IRA relationships either.

There is nothing in the described system which prevents a subject having more than one DRA—either because the subject has more than one key pair or because one or more key pairs are tracked by one or more DRAs.

The mechanism through which the DRA is sure of the subject's public key value is outside the description given here and is not part of the invention. There are however plenty of examples in prior art of how this relationship can be implemented. In fact, any RA—DRA or IRA—has to have some method of establishing the value of all the data items it holds "for real" on each subject, not just the public key. Again, there is a mass of existing prior art in this area. ("For real" means "not in a certificate signed by somebody else".)

The correct operation of this unspecified mechanism is axiomatic to the whole model. Everything that happens elsewhere in the model depends on this part being done correctly.

Figure 5:
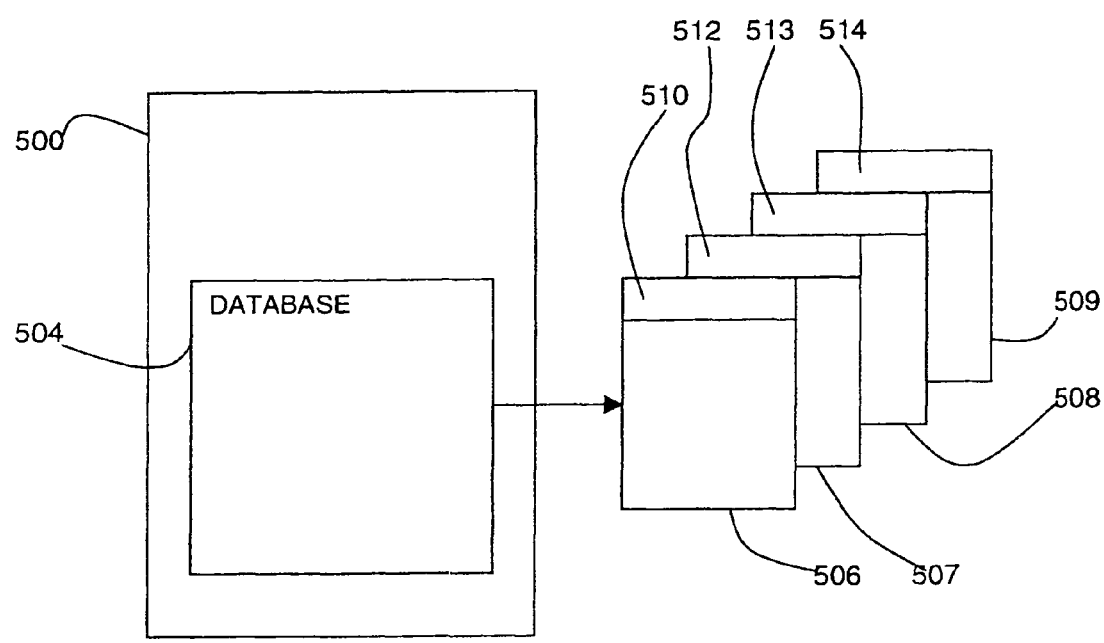
FIG. 5 is a diagrammatic representation of part of the system in accordance with the present invention.

FIG. 5 shows a representation of the RA 500 of the described system. The RA holds a database 504. 506, 507, 508, 509 are single views of the database. Each view 506, 507, 508, 509 has a distinguished name 510, 512, 513, 514 for that view which is the primary identifier. The views 506, 507, 508, 509 can also include attributes from the predicate of the selected view of the database, including public key values, locators, authorizers, etc. In the described system, RAs have the following capabilities.

An RA (of either class), in its role as a database controller, can maintain and process the data it holds on each subject for whatever reason it is, apart from being an RA, that it holds that data. So, for example, the personnel department of Alice Earthling's employer Acme will continue to process the monthly payroll against the employee database.

An RA (of either class) can receive and process entry updates digitally signed by the subject. The RA knows the subject's public key (either because, as a DRA, it is tracking it or, as an IRA, because it can validate the cached certificate against the CRL), so it is always able to check the signature.

Importantly, an RA can send a message to a certificate authority (CA) which can result in the CA signing or revoking a digital certificate.

The described system predicts that many organizations—and perhaps most organizations within the public sector—will become RAs. In such cases, being an RA will be incidental to being something else. There is no specific requirement in the system for organizations whose whole business mission is that of an RA, although such organizations are obviously possible.

The Signing Device

The model abstracts a digital signature to the operation of a finite state machine called a signing device. The signing device has access to a source of local time which corresponds to the usual standards notion of GeneralizedTime and which increments with a granularity of one second. The state of the machine is defined by:

the value of a key pair, which can change from time to time;

the value of an empowerment certificate serial number, which is an integer that increases before or after each signature operation; and (optionally) by a set of values that enable intelligent guesses to be made of data to be included in an empowerment certificate.

How the machine and its state are implemented is not defined in the model and are not part of the invention, but it may prove helpful to think of a smart card or a wireless device. There are minor privacy advantages in incrementing the serial number by amounts other than unity to obfuscate the rate at which Alice is effecting signing operations.

A signing operation might proceed as follows:
The device takes the value of the local time.
The device increments the empowerment certificate (EC) serial number.
For each of zero or more objects to be signed in turn it displays each object to Alice, and receives from her a decision whether or not to sign.
For each object that Alice wants to sign, if any, the device computes a signature block over a data structure consisting of:
  the object to be signed;
  a reference, by serial number and the hash of Alice's public key value, to the EC about to be created; and possibly other information.
The device then displays an EC confirmation screen with intelligent guesses of the values to be included in the EC, together with the EC serial number. These intelligent guesses are computed from information provided externally to the device
when it was invoked, and from the internally-held optional values.
The device builds the EC from the information Alice provided (or accepted from the intelligent guesses) and from the signature blocks of the signed objects. The period of validity of the EC is set to begin at the time taken at the start of the operation (in the first bullet above), and ends one second after the GeneralizedTime recorded at the end of the operation, or, with Alice's approval, a longer period. The device appends Alice's signature to the EC.

The Empowerment Certificate

As an alternative to certificates described in prior art, the described system provides for Alice's software to send Bob an empowerment certificate. This alternative mechanism has a number of unique advantages that mean that Alice does not need to be "issued" with a traditional certificate (or, indeed, any digital certificate at all).

Although Alice has not been "issued" with a certificate, her software still transmits a certificate with every object she signs, but it is always a certificate that her software has built for her and that she herself signs immediately after signing the object to be signed. The whole transaction can sometimes be completely encapsulated in the self-signed certificate alone, making the signing of an associated object unnecessary. The described system calls these special self-signed certificates "empowerment certificates".

Empowerment certificates can be seen as a mechanism by which a user empowers others to gain access to their personal data, including their public key which can be considered to be an ordinary piece of personal data.

The generation of an empowerment certificate includes the following steps. The objects to be signed, if any, are signed first, with a forward reference to the empowerment certificate about to be created included in the data to be signed. The empowerment certificate is then created and signed, with a backward reference to the signature blocks of the signed objects (if any).

The following information is contained in an empowerment certificate:
  A distinguished name that Alice asserts as "issuer".
  The same distinguished name as subject.
  The distinguished name of the relying party.
  The distinguished name of an RA who can resolve Alice's distinguished name to a public key value (or to one or more such values).
  A period of validity beginning one second before the time taken at the start of the signing operation and ending no earlier than two seconds after that time.
  (Optionally) a set of attribute definitions.
  For each attribute definition, either an asserted value or the distinguished name of an RA who holds that attribute value for the subject.
  (Optionally) the distinguished name of an RA who holds the particular attribute that is the subject's public key value.
  (If any) the signature block(s) over the previously signed object(s).
  (If any) a random nonce or other information provided by the relying party. A nonce is typically a large number whose value until it is generated is unpredictable.
  (Optionally) the subject's public key or one of the subject's public keys, or a reference to such a key.
  (Optionally) policy information. Alice might include a statement of the purposes for which she agrees that the personal information asserted or referenced in the empowerment certificate may be used, or the purposes for which she states that it may not be used. She may also indicate her approval for the later generation of a custom qualified certificate using the EC.
  The subject's signature over all the above. There are circumstances (basically, those circumstances in which the signature on the empowerment certificate will never be verified) in which the signature can be omitted, but these circumstances are not discussed further.

Optionally, the model allows for the possibility that one or more of the RAs which hold the data to be provided are referenced indirectly in the empowerment certificate rather than by distinguished name. The EC might identify a proxy service which knows which RA is to be used for each attribute. There is clearly no limit to the amount of such indirection (one proxy pointing to another proxy, and so on) which might in principle be implemented.

On receiving the empowerment certificate and any signed object(s) from Alice, Bob has four options:

1. Bob may just simply believe what Alice has asserted, not even bothering to check the signature on the empowerment certificate.

At its simplest, the described system acts as a method of transmitting unauthenticated personal data. If Bob is a government agency and Alice wants to be mailed an information leaflet, then it does not much matter if she is lying about her name and home address. This simple use of the empowerment certificate can also deliver the same sort of benefits as browser cookies.

More usually, if there is an accompanying signed object, Bob may not bother to check the signature on the empowerment certificate if he has an longterm custom certificate cached which contains Alice's public key. He will simply pull Alice's distinguished name from the empowerment certificate, find the relevant longterm custom certificate and extract her public key from there to check the signature on the signed object.

2. Alternatively, Bob may check the signature using an asserted value of the public key and just simply believe the rest of the asserted information (if any) if the signature checks out.

This is of some use because, if Bob caches empowerment certificates, it can provide a session mechanism in applications where key revocation is not important. That is, Bob will associate Alice's first visit to his website with her second and subsequent visits, without necessarily getting to know for sure any of Alice's personal data except her public key value. Bob can prevent replay attacks by supplying a nonce for each visit or by checking for increasing empowerment certificate serial numbers. If Alice asserts some other identifier (even a pseudonym) on any visit, then she need not assert her public key on subsequent visits. This mechanism cannot, however, recover from compromise of Alice's signing device, or from Alice rolling over her key. In the first case, someone else can take over the "session"; in the second case the session ends without the possibility of any in-band explanation to Bob.

Despite its limitations, this mechanism has considerable advantages compared to password-based website logon schemes.

3. Another possibility is that Bob checks the signature on the empowerment certificate using a public key value for Alice that he has cached on a longterm custom certificate or knows in some other way (because he is her DRA, for example).

This provides a method of authentication that can cope with revocation. Once again, Bob can use a nonce or a serial number check to guard against replays. Bob may also be happy to believe without further assurance the asserted information (if any) in the empowerment certificate that differs from what he already has cached or otherwise knew.

This use of empowerment certificates provides a method for subjects to inform RAs of changes they need to make to their databases. Archive of the empowerment certificate provides an audit record signed by the subject.

4. Most importantly of all, Bob can use the empowerment infrastructure to convert a properly-signed empowerment certificate into a custom certificate (or, indeed, more than one custom certificate). This is a crucial part of the described system and is explained next. If Bob takes this route, it is prudent for him to check that Alice has correctly copied the object signature block (if any) to the empowerment certificate.

The Custom Certificate

Just as Alice has a contract with one or more RAs, so Bob, if he wants to convert an empowerment certificate into a custom certificate, needs to have a contract with one or more CAs. The process is straightforward. At any time before the expiry of the empowerment certificate (or as soon as possible after the expiry of an instantaneous empowerment certificate), and as many times as he likes, Bob sends to a CA an empowerment certificate which he has received and the CA signs and returns an equivalent custom certificate, customised to Bob's requirements. There are no restrictions in the system on Bob's choice of CA, or on how many times (provided, in the case of an instantaneous empowerment certificate that he is quick), or to how many different CAs he sends the same empowerment certificate.

What the CA is doing is executing Alice's mandate, given when she created the empowerment certificate, for certain of her personal data to be shared with Bob. Her public key is a piece of personal data which may be shared in this way.

The following describes the method steps. If anything goes wrong, the process ends and Bob's request is rejected with a reason code. The CA generates the serial number of the custom certificate being prepared and copies the empowerment certificate serial number, the hash of the empowerment certificate, the object signature blocks (if any) and the nonce (if any) as attributes in the custom certificate. The CA copies its own distinguished name into the issuer field along with a timestamp For a longterm empowerment certificate, the CA checks that the period of validity of the empowerment certificate will not have expired before the time likely to assemble and sign a custom certificate. For an instantaneous empowerment certificate, the CA checks that only a reasonable period of time has passed since the empowerment certificate was signed. "Reasonable" means that Alice's personal data is highly unlikely to have changed since she signed the empowerment certificate.

For both longterm empowerment certificates and instantaneous empowerment certificates (for which the reasonable period has not passed), the CA will set the validity period start time of the custom certificate the same as the start time of the empowerment certificate. Otherwise (and this will clearly apply to longterm custom certificates only), the validity period start time will be set to the time by the CAs clock. As an option, to support store-and-forward transactions, it may be useful for the start time to be set to a significantly earlier time.

The custom certificate validity period end time will be set to the empowerment certificate validity period end time, or to an earlier time that Bob specifies.

The CA checks that Bob is named as relying party in the empowerment certificate and names Bob as the relying party in the custom certificate. Within defined rules, certain changes to the presentation of Bob's name is permitted. (The analogy here is the flexibility with which banks match payee names on checks to accountholder names.)

The CA checks that the empowerment certificates subject name and "issuer" name are identical and copies the value into the subject field of the custom certificate. Again, within defined rules, changes to Alice's name are permitted.

The CA ignores (that is, treats as if they were not present) any attribute in the empowerment certificate that has been asserted rather than referenced to an RA. Asserted attribute values in empowerment certificates have benefit in the part of the communication between Alice and Bob not involving a CA. Asserted public key values do have one use within the infrastructure, which is explained below.

The CA then presents the empowerment certificate to the RA identified in the empowerment certificate as able to resolve Alice's distinguished name into her public key. If this is a longterm empowerment certificate, the RA will first check to see if Alice has revoked it. How the RA does that is explained later. (The instantaneous or longterm status of the custom certificate is irrelevant.) In any case, the RA checks the validity period of the empowerment certificate.

The RA consults its database, extracts the value of the public key and checks the empowerment certificate. If it knows of more than one public key for Alice it will try each in turn, guided by hints she has included in the empowerment certificate (for example, asserting the value of, or the value of the hash of, a public key), until the signature on the empowerment certificate checks out.

For longterm custom certificates only, the RA adds, to each of the attributes that compose the distinguished name, a label of the following form ("DN flag", CA's distinguished name, custom certificate serial number, expiry date). No label is added for an instantaneous custom certificate. (The instantaneous or longterm status of the empowerment certificate is irrelevant for this decision.)

The RA examines the empowerment certificate to see if it is named as the RA for any of the predicate attributes, including the public key. It pulls out of its database any values that Alice has empowered. For a longterm custom certificate only, the RA adds to each attribute a label of the form ("att flag", CA's distinguished name, custom certificate serial number, expiry date). No label is added for an instantaneous custom certificate. (The instantaneous or longterm status of the empowerment certificate is irrelevant for this decision.)

For longterm custom certificates, the RA caches the empowerment certificate, and records the mapping of empowerment certificate and custom certificate serial numbers, expiry dates and "issuers".

The RA sends the following information back to the CA:
Alice's public key value.
The values of any predicate attributes for which it is responsible.

If a public key value is included among the predicate attributes and Alice has more than one public key, the RA will choose one on the basis of the public key value or hash value that Alice asserted. This may or may not be the same value as the public key value returned above, because Alice might approve with a signature using one private key the creation of a custom certificate containing the public key corresponding to another of her private keys.

The CA is now able to check the signature on the empowerment certificate, and does so. If there are any more RAs to be consulted, the CA sends out the empowerment certificate in parallel to them, along with the first public key value returned by the first RA. The RAs check the empowerment certificate, including again its expiry and revocation status, use the distinguished name in the empowerment certificate, or the public key value, to identify the subject, and return the values. As before, for longterm custom certificates they label "att flag" attributes, cache the empowerment certificate and map the empowerment certificate to the custom certificate.

Note that the public key to be included in a public key custom certificate may be provided by an RA other than the RA who initially resolved Alice's distinguished name into her public key.

With all the attribute information back, the CA now marks the certificate to indicate the certificate policy that Bob has requested. In particular, if Bob has asked for a qualified certificate, and the CA is happy that this is possible, the CA marks the certificate as qualified, with a liability limitation the lower of what Bob has requested and what the CA is willing to offer. The policy Alice set in the EC will also constrain whether or not a custom qualified certificate can be generated.

To get the policy and liability he wants, Bob can even submit the empowerment certificate independently to two or more CAs, or to the same CA multiple times, playing off the weakness in one policy with the strength of another, to use one custom certificate to reinforce another, or to spread a qualified certificate liability over two or more CAs.

There is one important constraint on the policy that the CA defines in the custom certificate. Any personal data policy limitations that Alice defined in the original empowerment certificate are carried forward into the custom certificate.

Finally, the CA informs the RA who resolved Alice's distinguished name into her public key the fact of transfer to Bob of the custom certificate. The CA will provide the serial numbers of the empowerment certificate and longterm custom certificate, and say whether the longterm custom certificate is qualified or not (so that Alice knows if her signature was upgraded to qualified status as defined in article 5.1 of the EU Electronic Signatures Directive). The RA is specifically not told anything else about the policy, and is not told the amount of any liability limitation. (It is none of Alice's business what value Bob attaches to his relationship with her.)

Bob obviously has an option to ask for only a subset of the possible predicate attributes to be included.

Figure 6:
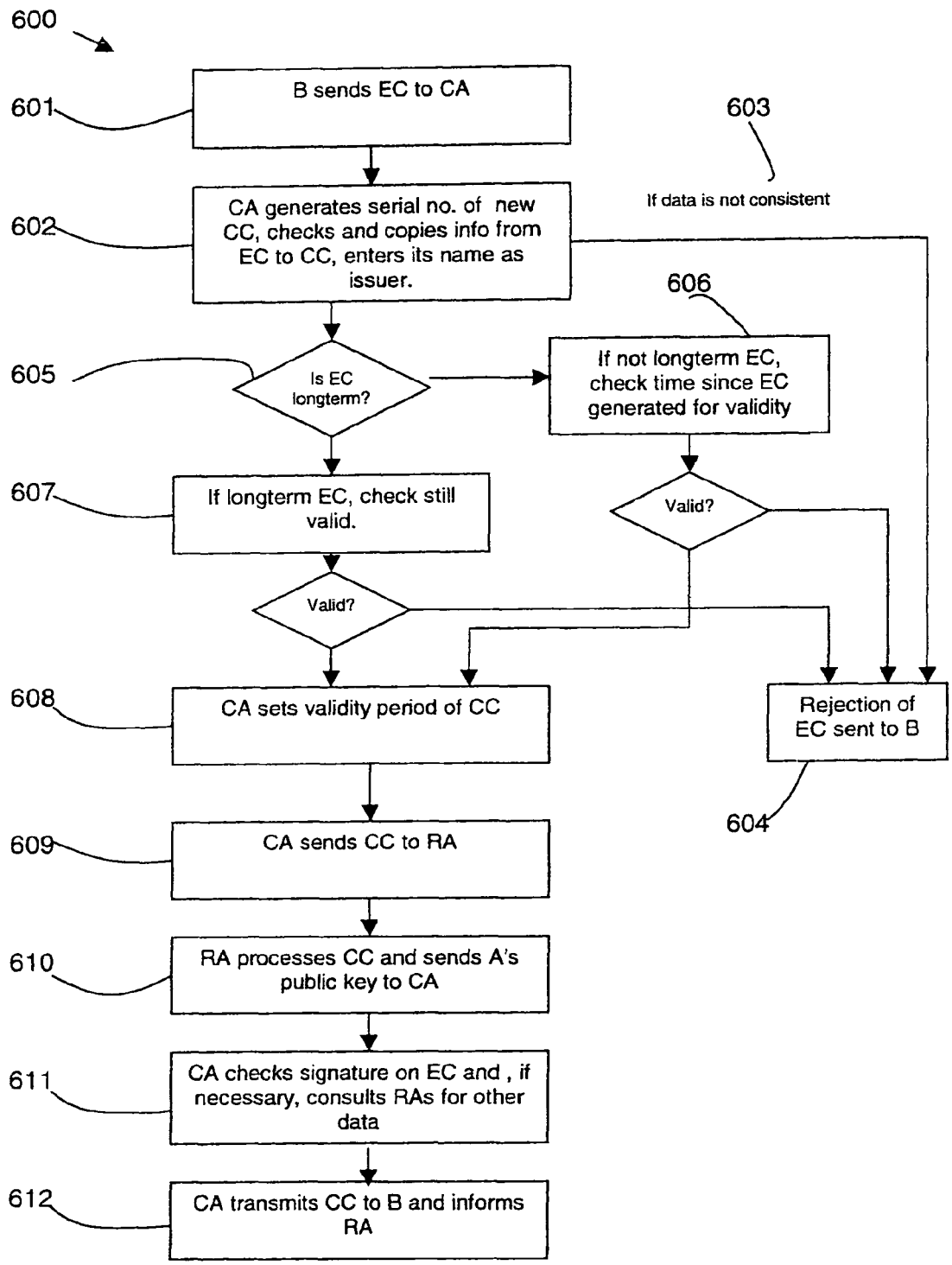
FIG. 6 is a flow diagram of part of the system of FIG. 3.

FIG. 6 shows a flow diagram of the method 600 carried out by the CA. The method 600 starts with the empowerment certificate being sent by Bob to the CA 601. At step 602, the CA generates a serial number for the new custom certificate, checks that the data of the empowerment certificate is consistent and copies the data into the custom certificate and enters its name as the issuer of the custom certificate. If any data is inconsistent 603, the empowerment certificate is rejected and returned to Bob 604.

The CA checks the validity of the empowerment certificate by first ascertaining if the certificate is instantaneous or longterm 605. If the empowerment certificate is instantaneous, the time since it was generated is checked to make sure this is within a predetermined time 606. If the empowerment certificate is longterm, the validity period is checked 607. If the empowerment certificate is outside its validity period, the empowerment certificate is rejected and returned to Bob 604.

The CA then sets the validity period of the custom certificate 608 and sends the custom certificate to the RA 609. The RA processes the custom certificate and sends Alice's public key to the CA 610. The CA checks the signature of the empowerment certificate with the public key 611. If some of the data referred to in the empowerment certificate is held in other RAs the CA will send requests to the other RAs for the data. The CA signs the custom certificate and transmits it to Bob 612. The CA also informs the RA that the data has been sent to Bob.

The Custom Certificate Revocation List

Just as the system provides for custom certificates, so too there are custom certificate revocation lists. They apply to longterm custom certificates only, because instantaneous custom certificates expire within a second of their generation, so the question of their revocation never arises.

Through a mechanism that is about to be explained, a CA will become aware of any change to information included in a longterm custom certificate that it has signed, provided that the change occurs before the expiry of the longterm custom certificate concerned. Also, Alice can at any time revoke any of the empowerment certificates she has signed, which means that the corresponding longterm custom certificates must also be revoked. Bob can also ask for any longterm custom certificate in which he is named as relying party to be revoked.

A CA maintains a separate custom certificate revocation list (CRL) for each of its customers, and each customer only gets to see its own CRL. Bob can consult his CRL anytime he wishes, can specify the normal frequency he wants CRLs updated, and can even force the creation of a new CRL at any time. Bob can also be asked to be notified each time a new CRL is available for his inspection. Bob can archive CRLs so that he can later prove that a particular longterm custom certificate was unrevoked at any particular time.

Whenever a certificate serial number appears in a CRL, Bob will want to archive the revoked certificate. If the empowerment certificate that matched the revoked longterm custom certificate is still unexpired, then Bob can resubmit the matching empowerment certificate and try to get a new longterm custom certificate with updated content. Whether he is successful or not depends on the reason for revocation, and Bob can see the revocation reason code in his CRL.

Clearly, if Alice revoked the empowerment certificate, then no way is the infrastructure going to yield up a longterm custom certificate to Bob. Alice has withdrawn that particular empowerment to her personal data. And a longterm custom certificate will not be recoverable if Alice's distinguished name is deleted.

If only the value of an attribute or a public key has changed, or if Alice has simply changed the way her personal data is allocated to RAs, then the empowerment certificate can usually be resubmitted and a replacement longterm custom certificate obtained, valid for the remaining duration of the empowerment certificate.

Bob can request a longterm custom certificate at any time before the empowerment certificate expiry. Bob can even contract with the CA for the CA to automatically process a new request every time a revocation occurs, without Bob needing to start the exercise off. And Bob can present the same empowerment certificate to different CAs during its lifetime.

So, as Alice rolls over her key pair, or changes her name-on marriage, or receives an increased purchasing limit from Acme, or changes bank, or moves house, or changes phone number, or even changes employer, the longterm custom certificates around the world which name her as subject will quickly get revoked and replaced. Bob's address book will always be up to date. Alice needs to tell just one of her RAs of her change of circumstances, and everyone she has empowered to know about those circumstances will very soon know what has happened. This applies to every piece of data in unexpired longterm custom certificates—identifiers, predicate, authenticators, authorizers, locators.

Every time a CA revokes a longterm custom certificate it flags the serial number of the revoked longterm custom certificate to the RA who resolved Alice's distinguished name into her public key.

The following describes how the method works in detail.

Alice is optionally able to maintain, through her software functionality, constructs known as empowerment certificate revocation lists (ECRLs). At any time she can present to any of her RAs an ECRL listing the serial numbers of previously-generated longterm empowerment certificates still valid that she wishes to revoke. (Instantaneous empowerment certificates expire shortly after their creation, so the question of their revocation never arises.)

When any of the RAs receives an ECRL, it extracts from the list the serial numbers of all the empowerment certificates which it has processed for Alice, looks at its mapping table to find the matching CA names and custom certificate serial numbers, and sends signed messages to each CA instructing revocation on the grounds of "empowerment certificate revocation".

If a particular empowerment certificate names more than one RA, Alice can send the ECRL to any one of them. This provides her with the ability to revoke a part of an empowerment certificate, at the granularity of the RA. It is even possible to allow revocation at the granularity of an attribute. There is a requirement for a revocation code "partial empowerment certificate revocation".

If Alice decides to move an item of her personal data from one RA to another, the RA will look at the labels on that item of data, extract the serial numbers of unexpired custom certificates and send signed revocation messages to the relevant CAs, with a reason code "change of RA".

Every time a piece of Alice's data changes value in its database, the RA will examine the labels attached and will send out signed revocation messages for each custom certificate. For custom certificates where the DN flag is set, the revocation reason will be "identity deleted". Where the att flag is set, the reason will be "attribute change".

Finally, if, through methods not defined in the system, an RA learns of the death of a subject, it will cause the revocation of all that subject's unexpired custom certificates with a reason code "death of subject".

It is worthwhile resubmitting unexpired empowerment certificates only if the revocation reason was "partial empowerment certificate revocation", "change of RA" or "attribute change".

Figure 7:
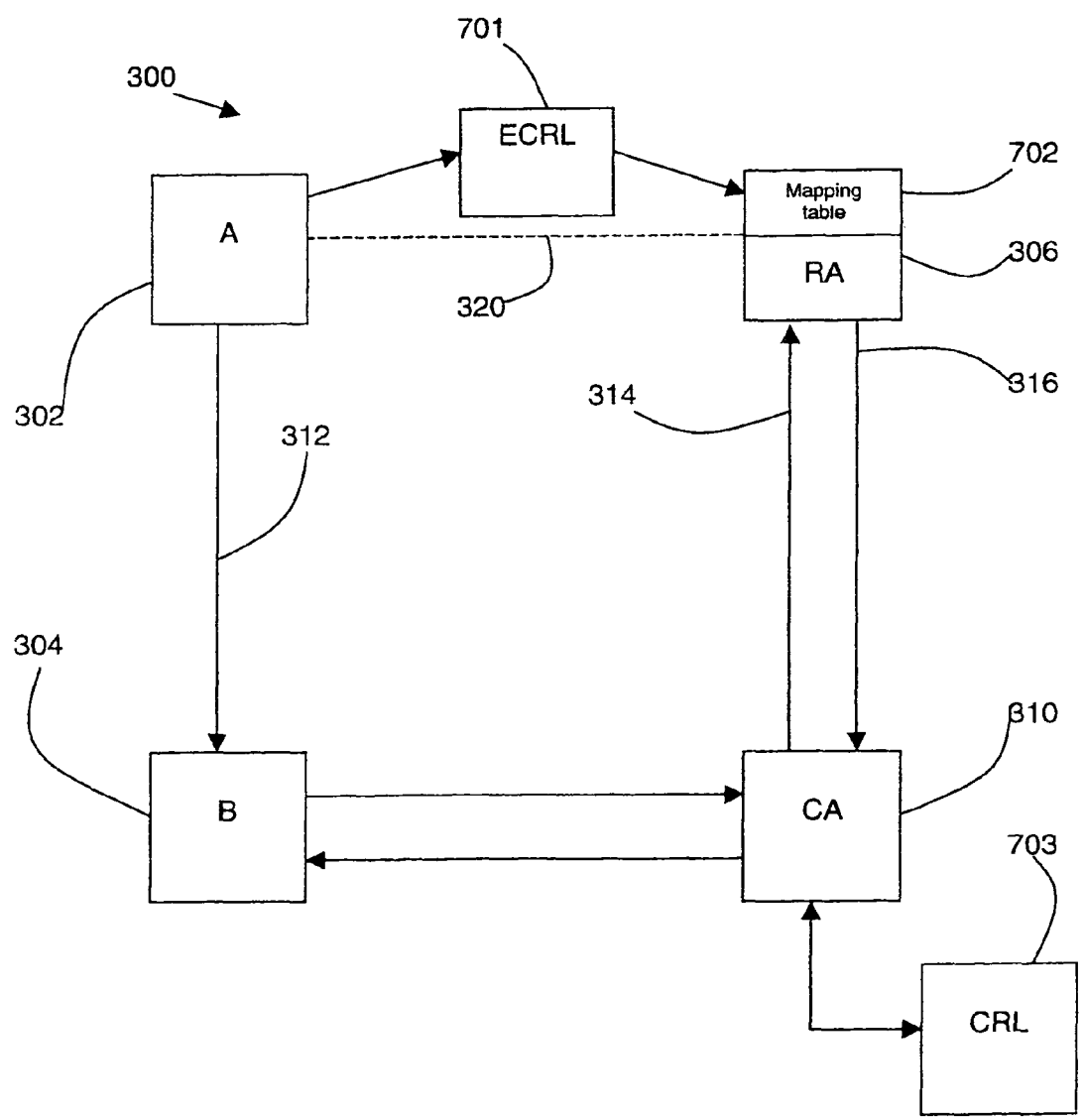
FIG. 7 is a diagram of a system in accordance with the present invention.

FIG. 7 shows the diagram of FIG. 3 with the addition of the certificate revocation lists. An empowerment certificate revocation list 701 is transmitted by Alice 302 to the RA 306. The RA 306 has a mapping table 702 in which a record of all empowerment certificates and custom certificates is kept with reference to their serial numbers and a record of the CAs to which the data has been supplied. The RA 306 can inform the CAs of any custom certificates which should be revoked further to a revocation request from Alice 302. The CA 310 keeps a certificate revocation list 703 for each relying entity such as Bob 304.

The Infrastructure

The empowerment infrastructure consists of a secure (that is, signed and encrypted) messaging and transaction system linking a set of RAs and CAs which offer empowerment services to their customers. Methods of implementing such transaction systems are well described in prior art.

As the CAs and RAs communicate securely among themselves, they in turn could exploit the same mechanisms as we have shown Alice and Bob to exploit.

Ownership of Electronic Property

The following describes a method and system to assign ownership of electronic property such that the ownership is safeguarded and can be proved by automated means. The described technique assumes the existence of an empowerment infrastructure as previously described.

For automated systems, especially where they are pervasive and communicating with each other, it is essential to be able to check the rightful ownership of electronic property without human intervention wherever that is possible.

Electronic property is a general term used for any form of property that can be represented electronically. Electronic property may include, as examples only, financial instruments such as bonds and other securities, land titles, music, pictures, multi-media works, etc. Making copies of such electronic property is technically straightforward. The electronic property can therefore be traded and delivered electronically if it is possible to check automatically that a particular instance is owned by an entity and has been assigned to that entity from another entity.

Electronic property can be of two types.

Type I: The ability to view or playback the electronic property is not an issue. For instance, there is no commercial problem if a bond or land title is viewed by anybody—the issue is to ensure that the bond has been assigned by Alice to Bob.

Type II: The ability to playback is an issue. A picture should not be displayable and music should not be playable unless it is done under the authorization of the rightful owner.

The described method and system of assigning ownership of electronic property applies to both types but in different ways.

Let Alice assign to Bob ownership of some electronic property. Ownership in this context is used to include, absolute title, leasing, letting, permission to use and other forms of full or partial ownership of rights to use the property. Alice uses the facilities of the empowerment infrastructure. Alice signs the electronic property with a digital signature and creates an empowerment certificate (EC) for Bob. The signed electronic property and the EC are bound by a link.

The link could be:

A bit-string manufactured from the serial number of the EC and a random number generated for that particular assignment, and stored in both the signed electronic property and the EC. (The serial number of the EC on its own is not enough because it is possible that the serial numbers of two certificates to two different Bobs are the same.)

A bit-string associated with a watermark in the electronic property. Assume that the electronic property is using a watermarking technology which can be varied depending on a key. Then the key is used as the link and is stored in the EC.

Figure 8A:
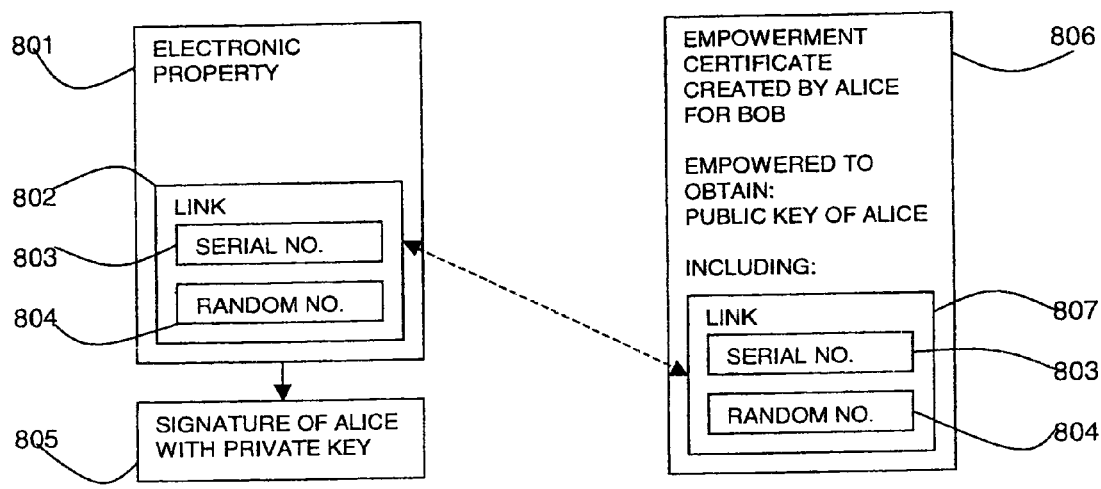
FIGS. 8A and 8B are diagrams of two forms of electronic property with associated empowerment certificates in accordance with an aspect of the present invention.

Referring to FIG. 8A, the first form of a link is illustrated. An electronic property 801 includes a link 802 in the form of a serial number 803 for an EC and a random number 804. The serial number 803 and the random number 804 may be combined in a variety of ways to generate the link, for example, using one-way functions, etc. The electronic property 801 and the link 802 are digitally signed with a signature block 805 generated by Alice using her private key of a private/public key pair.

Such a digital signature is generated by encrypting the electronic property 801, including the link 802, using Alice's private key. As described previously, in practice Alice may digest the electronic property 801, including the link 802, and encrypt the digest with her private key. An associated EC 806 is created by Alice for Bob which enables Bob to obtain Alice's public key and thereby verify the digital signature of the electronic property 801. The EC 806 includes, in addition to the usual requirements of an EC which have previously been described, a link 807 corresponding to the link 802 in the electronic property 801. The link 807 is generated from the serial number 803 of the EC 806 and the random number 804.

Figure 8B:
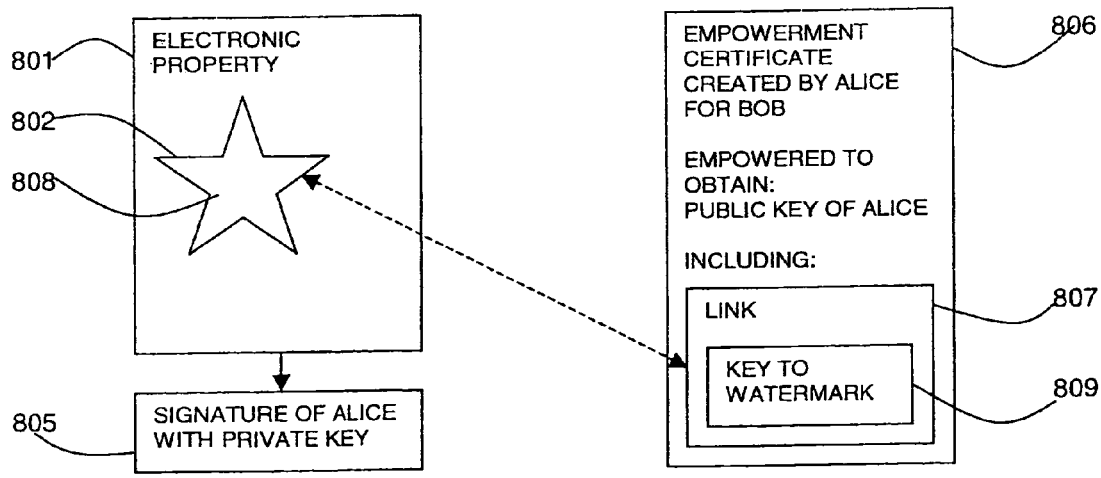

FIG. 8B illustrates the second form of a link. The electronic property 801 includes a link 802 in the form of a watermark 808 contained in the electronic property 801. The watermark 808 has a watermark key 809.

Conventional watermarks have long been used to authenticate documents by embedding an almost invisible mark within the paper of the document. Similarly, electronic watermarks can authenticate electronic documents, particularly images, by embedding hidden data patterns within the electronic data.

The electronic property 801, including the link 802, this time in the form of the watermark 808, is digitally signed with a signature block 805 generated by Alice using her private key.

In a similar way to FIG. 8A, an associated EC 806 is created by Alice for Bob which enables Bob to obtain Alice's public key and thereby verify the digital signature of the electronic property 801. The EC 806 includes, in addition to the usual requirements of an EC, a link 807 corresponding to the link 802 in the electronic property 801 and in this case the link 807 is the watermark key 809.

The generation of a digital signature and associated EC are described above in detail in sections "The Signing Device" and "The Empowerment Certificate".

In this embodiment, the EC 806 includes the following:

A name asserted by Alice. This may be any name including a pseudonym.

A name of the relying party (Bob).

One or more attribute identifiers and the name of RAs who hold the attribute values.

A period of validity for the signing of the electronic property by Alice.

A link means.

A name of the subject of the empowerment certificate may optionally be included. This could be the name of Alice if she is acting in a given capacity.

A period of validity of the ownership may also be included. This could be a finite period of use or a permanent assignment of ownership in which case the period is open-ended.

Alice's signature over all of the above.

The EC 806 empowers Bob to obtain the values of the attributes defined in the EC 806. The attributes include Alice's public key value and Alice's name as recorded as owner of the electronic property. Additional attributes can also be empowered by Alice. It should be understood that an attribute has a name or identifier and an attribute value. The EC 806 contains the attribute identifier and the attribute value is supplied by the RA source to the relying party.

The EC 806 contains the name of the assignee, Bob, of the electronic property 801 and may contain the name of the assignor, Alice. An automated system can use the facilities of the empowerment infrastructure to check that the assignment is bona fide and not forged and to establish whatever attributes of Alice and Bob that are required (as long as they have been empowered by Alice). This is done by Bob obtaining a custom certificate.

Once Bob has received the EC 806, he obtains a custom certificate based on the EC 806. Custom certificates are described above in the section "The Custom Certificate". A custom certificate is qualified if the CA from which Bob obtains the custom certificate provides a liability limitation. Qualified certificates are defined in the EU Electronic Signatures Directive (Directive 1999/93/EC). In this embodiment, the custom certificate may include the following:

One or more attribute values of Alice as authorized in the EC including Alice's public key at the time of signing.

The name of the CA.

The name of the relying party (Bob) which is taken from the EC.

A period of validity of the certificate which corresponds to the period of signing by Alice.

A period of validity of ownership of the electronic property which is taken from the EC.

The value of the qualification, if there is one.

The CA's signature over all of the above.

The link means can also be copied from the EC and included in the custom certificate.

Bob stores the qualified custom certificate as a certificate of ownership of the electronic property. All the above steps happen automatically and without human intervention.

Figure 8C:
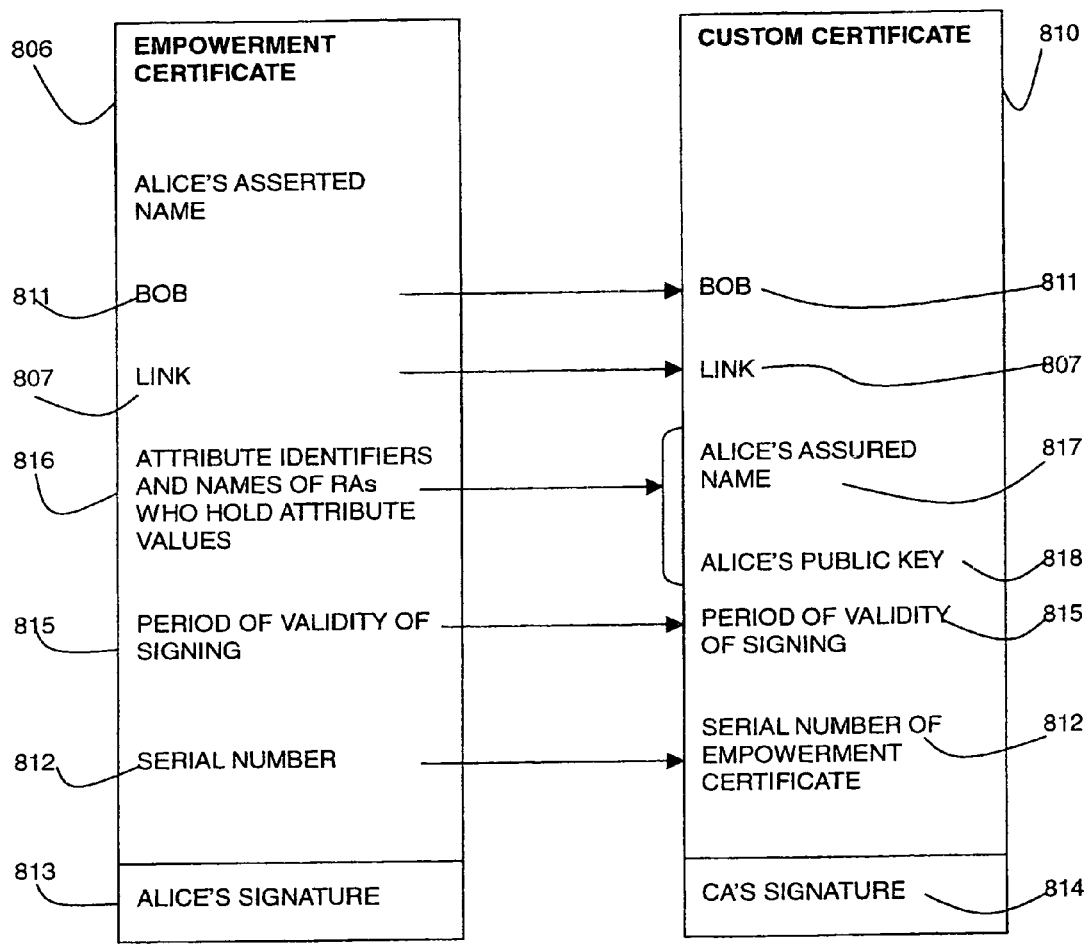
FIG. 8C is a diagram of an empowerment certificate and the associated custom certificate in accordance with an aspect of the present invention.

FIG. 8C shows a schematic diagram of the empowerment certificate 806 and the custom certificate 810. The EC 806 includes some items of information which are transferred to the custom certificate 810. These items of information include the name of the relying party (in this case Bob) 811, the link 807, the serial number 812 of the EC 806, and the period of validity 815 of the signature by Alice on the EC 806 (in order to ensure that the correct public key for Alice at the time of signing is provided). The EC 806 empowers Bob to obtain in the custom certificate 810 values of attributes 816 identified in the EC 806. The values of attributes given in the custom certificate 810 are the assured name of Alice 817 (the name in which the electronic property currently stands) and Alice's public key 818. The EC 806 is signed by Alice 813 using her private key and the custom certificate 810 is signed by the CA 814.

Figure 9:
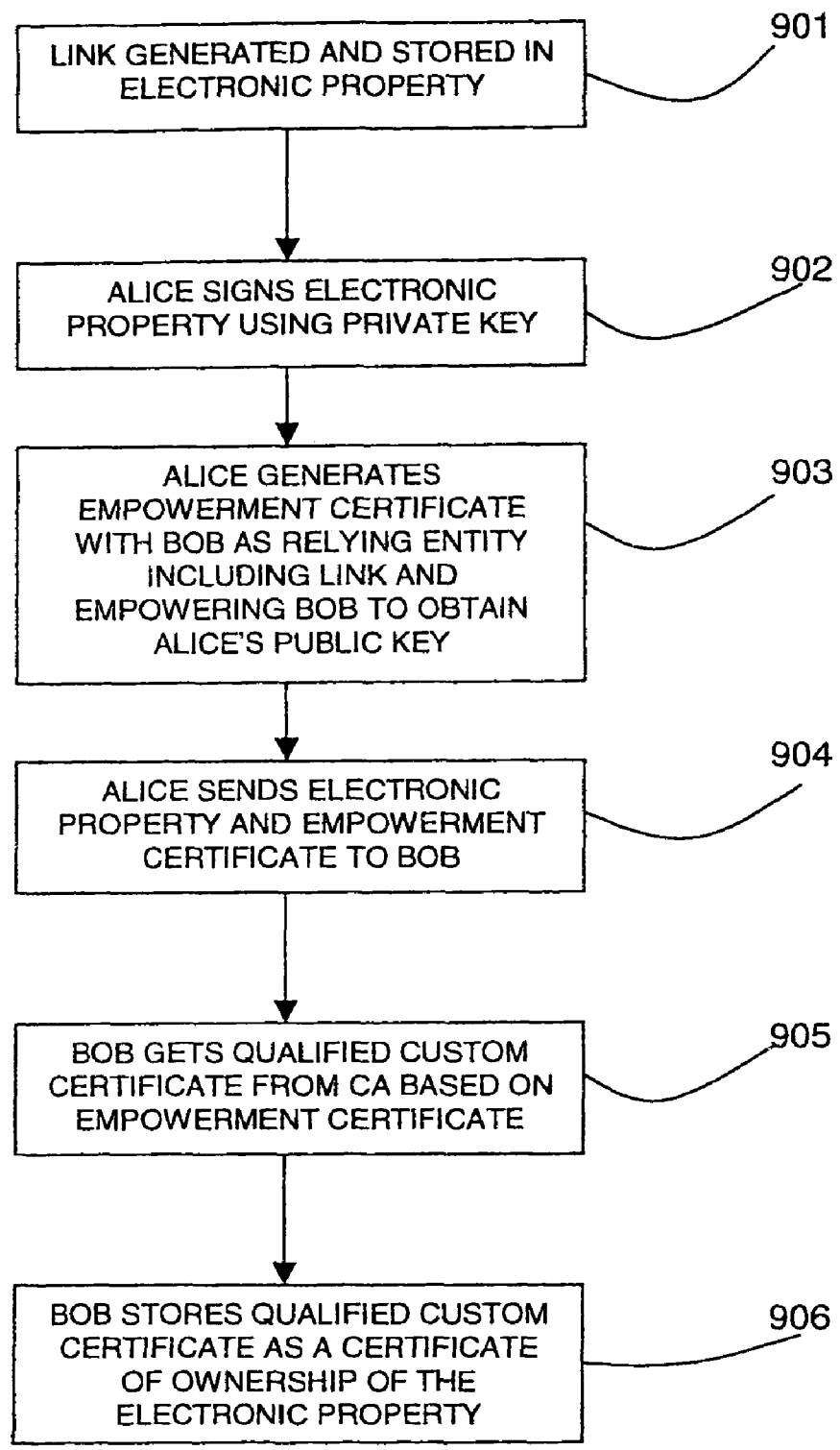
FIG. 9 is a flow diagram of a first method of transfer of ownership of electronic property in accordance with an aspect of the present invention.

FIG. 9 shows a flow diagram of a first embodiment of a method of automatic transfer of electronic property. The method is carried out by software activated by Alice or Bob.

Referring to FIG. 9, at step 901 a link is generated and one part of the link is stored in the electronic property to be transferred. The link may be generated with reference to an empowerment certificate which is about to be created, for example, the link may contain a serial number of the empowerment certificate. At the next step 902, Alice signs the electronic property using her private key. At step 903, Alice generates an empowerment certificate naming Bob as the relying entity and including the link. The empowerment certificate also includes attribute identifiers, the attribute values of which Bob is authorized to obtain. The attribute values include Alice's public key. Alice then sends 904 the electronic property and the empowerment certificate to Bob.

Bob receives the electronic property and the empowerment certificate and sends the empowerment certificate to a CA to obtain 905 a custom certificate. Bob stores 906 the custom certificate as a certificate of ownership of the electronic property. The custom certificate includes details of Alice's public key which enables Bob to confirm that it was in fact Alice that signed the electronic property. The custom certificate also includes details of the link which is taken from the empowerment certificate which binds the electronic property to the qualified custom certificate confirming that it is that electronic property which has been transferred.

This first embodiment of a method of transfer is sufficient for Type I electronic property. This technique could be used, for instance, to automate totally the paperwork (the back office function) associated with the transfer of financial instruments, land titles, etc. Also, a device could be programmed to refuse to run software (or to display a picture or to play music) that has not been correctly assigned to the current user of the device.

The first embodiment of the method for transfer is not entirely sufficient for Type II electronic property because it would be possible to program a device (if that device were entirely under the user's control) to ignored ownership and play back the material.

A second embodiment of a method for transfer of electronic property is described for the Type II electronic property in which only entities under authorization from the rightful owner can playback the electronic property.

In this embodiment, Bob sends Alice a request for an empowerment certificate. The request itself can be an empowerment certificate to Bob's public key or can simply assert Bob's public key if his identity does not need to be verified by Alice. If Bob uses an empowerment certificate, Alice can use the request to establish Bob's public key from a CA in the empowerment infrastructure.

Alice then uses Bob's public key to encrypt the electronic property using an efficient mechanism. For example, Alice may choose a random symmetric session key and use a symmetric cipher to encrypt the electronic property. Bob's public key is used to encrypt just the session key.

A link is provided in the electronic property as in the first embodiment and the electronic property is also signed by Alice using her private key.

Alice may alternatively sign the electronic property before it is encrypted with Bob's public key.

Alice generates an EC and names Bob as the relying party as in the first embodiment. Alice includes in the EC details of the link and the encrypted session key.

Once Bob has received the EC, he obtains a custom certificate from a CA as in the first embodiment. The link and the encrypted session key can be copied from the EC to the custom certificate such that the custom certificate becomes a certificate of ownership and contains all the required information. Bob can obtain the session key by decrypting it using his private key and Bob can playback the electronic property by de-ciphering it using the session key.

Playback by anyone other than Bob is rendered computationally infeasible because the electronic property is encrypted. But in the presence of Bob's signing device, the key can be taken from the certificate of ownership and decrypted and used to decrypt the electronic property for playback.

Figure 10:
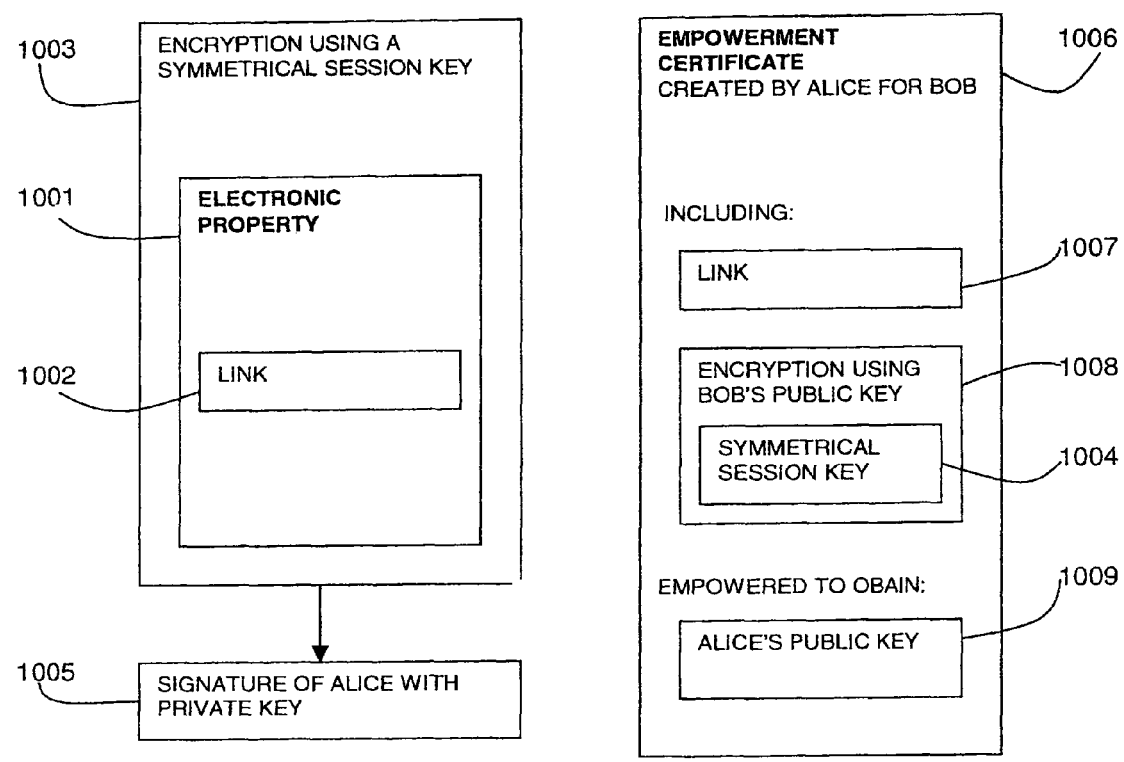
FIG. 10 is a further form of electronic property with an associated empowerment certificate in accordance with an aspect of the present invention.

FIG. 10 shows a form of electronic property and a corresponding empowerment certificate as used in the second embodiment of transfer of electronic property.

An electronic property 1001 includes a link 1002 in one of the forms described above in relation to FIGS. 8A and 8B. The electronic property 1001 is encrypted using a symmetrical cipher with a session key. The encrypted electronic property 1003, including the link 1002, is digitally signed with a signature block 1005 generated by Alice using her private key. As described above, in practice Alice may digest the encrypted electronic property 1001, including the link 1002, and encrypt the digest with her private key.

An associated EC 1006 is created by Alice for Bob. The EC 1006 enables Bob to obtain certain attribute values specified by Alice in the EC 1006 including Alice's public key 1009. The EC includes the corresponding portion of the link 1007 and the encrypted symmetrical session key 1004 which is encrypted using Bob's public key 1008. Bob knows his private key and therefore he can decrypt the symmetrical session key 1004 and de-cipher the electronic property 1001.

Figure 11:
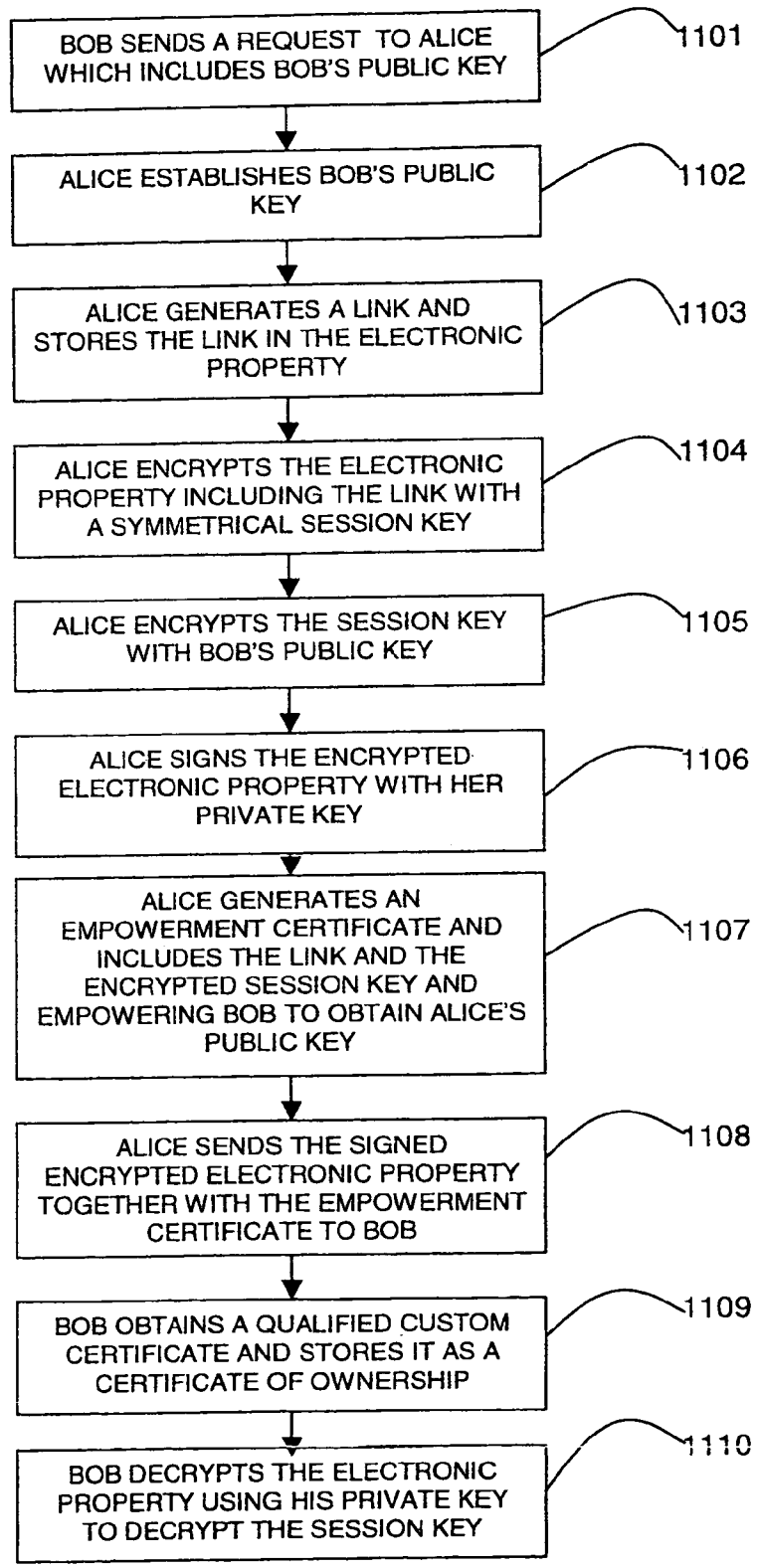
FIG. 11 is a flow diagram of a second method of transfer of ownership of electronic property in accordance with an aspect of the present invention.

Referring to FIG. 11, a flow diagram is shown of the second embodiment of the method of transfer of electronic property. Bob sends 1101 a request to Alice which includes Bob's public key. Alice establishes 1102 Bob's public key. Alice then generates 1103 a link and stores the link in the electronic property. Alice encrypts 1104 the electronic property including the link using a symmetrical cipher with a session key. Alice encrypts 1105 the session key with Bob's public key. Alice signs 1106 the electronic property with her private key.

Alice generates 1107 an EC and includes in the EC the link and the encrypted session key. The EC empowers Bob to obtain Alice's public key. Alice sends 1108 the signed and encrypted electronic property together with the EC to Bob. Bob obtains 1109 a custom certificate and stores it as a certificate of ownership of the electronic property.

Bob can decrypt 1110 the electronic property as he knows his private key and can decrypt the symmetrical session key and then decrypt the electronic property.

Transfer of Ownership of Electronic Property

In an environment that uses the above described methods to assign ownership of electronic property such that ownership is safeguarded and can be proved by automated means, a method is required to transfer ownership (by sale, for instance) that prevents multiple transfers of the same electronic property.

The problem is described more explicitly. Suppose Bob has some electronic property XYZ (which could be a film or a financial instrument like a bond—anything which is expressed as a bit-string) which has been properly assigned to him by Alice. Bob has a certificate of ownership as described above, i.e. a qualified custom certificate with a link to the electronic property XYZ and naming Bob as the target. Bob now has the means to prove his ownership of XYZ, where the proof could be carried out by wholly automated means. However, suppose Bob wishes to transfer his property XYZ. What is to prevent him doing so to Carol, Claudine and Chloe?—Selling it multiple times since it is possible at no expense to clone electronic property and its certificate of ownership.

This method describes a technique for transfer that prevents this kind of fraud and in addition allows the tracking of ownership where the competent authorities need to do so for criminal investigations.

The existence of an empowerment infrastructure is assumed containing within it the two kinds of actors: a Registration Authority (RA) which could be referred to as a trusted information provider and a Certificate Authority (CA) which could be referred to as a trusted information certifier.

Another actor is needed which is referred to as a Trusted Transaction Agent (TTA). This organization has the responsibility to keep track of transactions concerning 'things' carried out by a Bob and to report on the balance of the 'things'—in other words, keep account. These 'things' could be 'pounds', 'euros' or 'dollars' or other 'things' as long as they have an unique identifier. The TTA would preserve all the transaction instructions it receives, report on the balance at any point in time and be able to print a report on the transactions when required to do so (i.e. create a statement of account).

This extra actor is needed in any case when the empowerment infrastructure is used with any form of funds transfer function. The TTAs could be banks or similar organizations that hold funds for the Bobs (and Alices) and transfer these funds when instructed to do so by an Alice or Bob, to the account of a Bob or Alice at another, or the same, TTA. A 'trade account' run by a RA or a CA is an example of a TTA, though perhaps with limited function. The process of setting up and running TTAs and carrying out funds transfer between them is well understood and there are many existing systems to do so.

Secondly, it must be explained how a TTA can keep account of electronic property i.e. the XYZs. The technique is to take the hash of the electronic property, #XYZ, and to use this as the identifier of the 'things' about which the account is kept. A hash function is a one-way function which maps an arbitrarily long piece of plain text into a comparatively small fixed-length bit-string which is the 'digest'.

The hash function has the property that if the plain text is changed in any way, an entirely different value of digest is produced by the hash function. It should also not be possible to generate two forms of plaintext that have the same digest. Given XYZ it should be easy to compute #XYZ (hash of the plaintext). Given #XYZ it should be effectively impossible to find XYZ (the original plaintext).

A way of looking at it would be to say that this is an account kept in a unique currency, whose name is #XYZ. This identifier is for all practical purposes a unique identifier for XYZ—the chances of a collision are one in many trillion trillion.

So when Bob takes rightful ownership of the electronic property XYZ, his TTA opens an account for him of XYZs using as identifier, #XYZ. His TTA credits Bob with 1 in that account.

When Chloe wishes to buy from Bob, she will receive an empowerment certificate from Bob which is in effect an instruction from Bob to transfer ownership from him to Chloe. Chloe passes the EC into the empowerment infrastructure to be resolved, via her CA in the normal way.

This will drive a transfer from Bob's account at his TTA under the identifier #XYZ, to Chloe's account with identifier #XYZ which will be set up for her at her TTA, decrementing his balance by 1 and incrementing Chloe's balance by 1.

Bob's original certificate of ownership in the form of the qualified custom certificate will be revoked. If Bob has already sold the electronic property XYZ then this transfer instruction will fail—Bob's TTA will reject the transfer instruction because his account balance under identifier #XYZ stands at zero. Because Bob's certificate of ownership has been revoked, it may fail earlier because the process checks a CRL with Bob's CA (this step is faster but not so certain because Bob may be trying to sell XYZ several times within the latency of the CRL).

If the transfer instruction succeeds then Chloe's CA will, as requested, generate a qualified custom certificate for Chloe i.e. the certificate of ownership that Chloe needs. Chloe's account with her TTA under the identifier #XYZ will stand at a balance of 1, with the transfer instruction saved for audit purposes and for producing a statement of account when necessary.

The way it works for Alice is different because she originated the electronic property. Her account with her TTA is not incremented because she buys or for some other reason has XYZ transferred. So instead she sets up a balance with her TTA by asserting her ownership. This is in fact equivalent to her claiming copyright of the electronic property, and assertion is the way ownership works today—i.e. Alice asserts copyright and that is deemed to hold unless someone challenges it—there is no requirement that she proves it before use. It should be noted that in the case of, for example, a financial instrument, when Bob is arranging transfer to him, he is expected to exercise caveat emptor: he can learn from the empowerment infrastructure that Alice has asserted ownership rather than having it transferred to her from someone else; and that should be consistent with the content of the financial instrument.

Table 1 below shows the balance of accounts in the names of Alice, Bob and Chloe as the ownership of the electronic property is transferred between the parties.

TABLE 1

|  | Alice's TTA Account for #XYZ | Bob's TTA Account for #XYZ | Chloe's TTA Account for #XYZ |
| --- | --- | --- | --- |
| Original asserted ownership | 1 | 0 | 0 |
| Transfer from Alice to Bob | 0 | 1 | 0 |
| Transfer from Bob to Chloe | 0 | 0 | 1 |

In addition, each TTA has kept on file the transactions (the empowerment certificates) that instructed each transfer so that it is technically possible to follow the trail from every point backwards to the originator and forward to the current owner. This trail will be of great importance to the competent authorities for forensics.

Electronic Voting

There are three aspects to electronic voting:

1. The reliability of the count. This is the area where most of the cryptographic research has focused. There are now available solutions which achieve very high levels of cryptographic strength at the cost of very high amounts of computer power.

2. The possibility of error at the interfaces. Following the difficulties in the US presidential election of November 2000, a lot of thought has gone into this.

3. Remote authentication of the voters. Identifying and authenticating the voters is recognized as important, but little real progress has been made in this area. The empowerment infrastructure described previously can help here, though the problems remain difficult ones.

The described method and system relate mainly to the interface between authentication and confidentiality, and the handling by an empowerment infrastructure of issues of identity and authentication.

The Goals of an Electronic Voting System

Goals relating to the Reliability of the Count

1. Nobody can vote more than once. This can be achieved by each voter having a unique serial number, which must accompany the vote. To prevent a Counting Organisation (CO) from creating extra votes, the serial numbers are issued by a separate Authentication Agency (AA). To prevent the Authentication Agency from giving a non-existent voter a serial number, the names (but not serial numbers) of voters can be published.

2. Nobody can know for whom a particular person has voted. This can be achieved as follows:
   a). By encrypting the vote with the public key of the Counting Organization—to protect the vote in transit.
   b). By separating the Counting Organisation from the Authentication Agency—to prevent anyone at the Counting Organisation finding out.

(An alternative to separation is possible by "anonymous distribution" of serial numbers, but this is very expensive in computing power, and makes a transition—rather than a change—from the current system very difficult.)

3. Nobody can change a vote once cast. This can be achieved by including, with the vote, a cryptographic digest signed by the voter.

4. The public has confidence that voting data is not used for any purpose other than the election. In an electronic voting scheme, there would be questions asked about the danger of collusion between the Counting Organisation and the Authentication Agency.

5. A voter can check that his or her vote was counted. In an electronic system, if the voter includes a nonce of his or her own choosing with the vote, a table of nonces corresponding to votes for a candidate can be published, which will be meaningful only to the individual voters. A nonce is a random number or other information provided by a party, in this case the voter. A nonce is typically a large number whose value until it is generated is unpredictable.

6. Nobody can duplicate another voter's vote. The nonce system prevents this.

7. Nobody can sell his or her vote. In an electronic system, this would require a random spoiler being included in the voting software.

Goals Relating to the Possibility of Error at the Interface

8. Everybody's vote gets through. Not everybody who asks the AA for a serial number will get around to voting. How does the CO tell the difference between these people and cases where a vote has got lost in the post? Industrial strength assured-delivery middleware, such as MQSeries (Registered Trade Mark of International Business Machines Corporation), would be an option.

9. No vote falls through, still less emerges from, the cracks. The route from voter to CO is likely to have places where the message is changed in form. This must not be allowed to affect the voting messages. Assured-delivery middleware again addresses this problem.

10. A recount is possible in the event of a system crash. This means that voting messages, and enough ancillary information to make sense of them, must be taken offline. An advantage is that an audit, as well as a recount, becomes possible.

11. There must be a smooth transition from the existing paper system to the electronic system. All polling stations may have to have a terminal for the officials, so that their electoral roll includes only people who have not asked the AA for a serial number (and, ideally, excludes anybody whose death has been registered).

Goals Relating to Remote Authentication of the Voters 12. only authorized voters may vote. Using the empowerment infrastructure, one can authorize someone to vote, not on the basis of a fixed electoral roll but on the basis of identity, age, residence, nationality, and not being excluded from voting.

13. Identity will be established at least as well as under the present system. The basis of identity that will be used is a matter of policy. It must be decided whether name, address and date of birth are enough. Nationality and not being one of the prohibited classes need to be empowered as well.

14. The Electoral Roll should be dematerialized. When everyone can establish his or her identity without it, the document itself is no longer needed.

Referring to FIGS. 12 to 15, a simplified example of a method and system for electronic voting is now described which addresses the above goals.

Figure 12A:
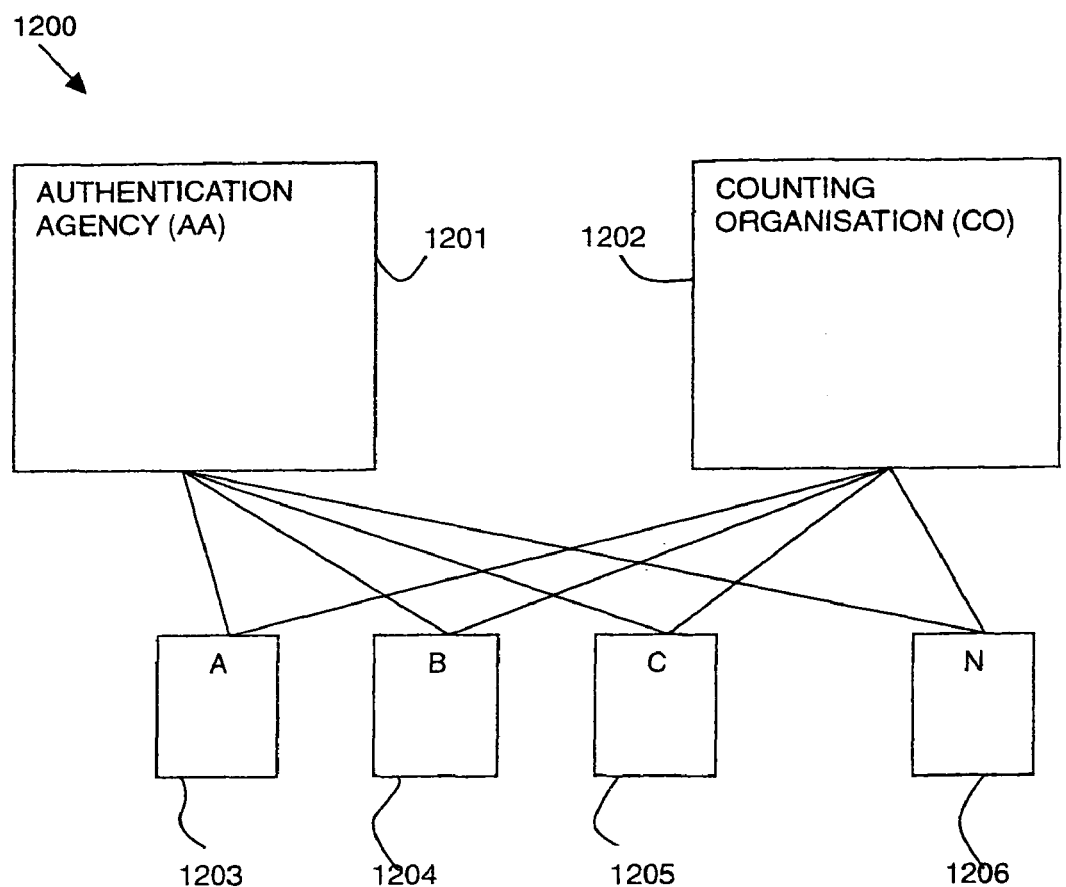
FIGS. 12A and 12B are schematic diagrams of an electronic voting system in accordance with aspects of the present invention.
Figure 12B:
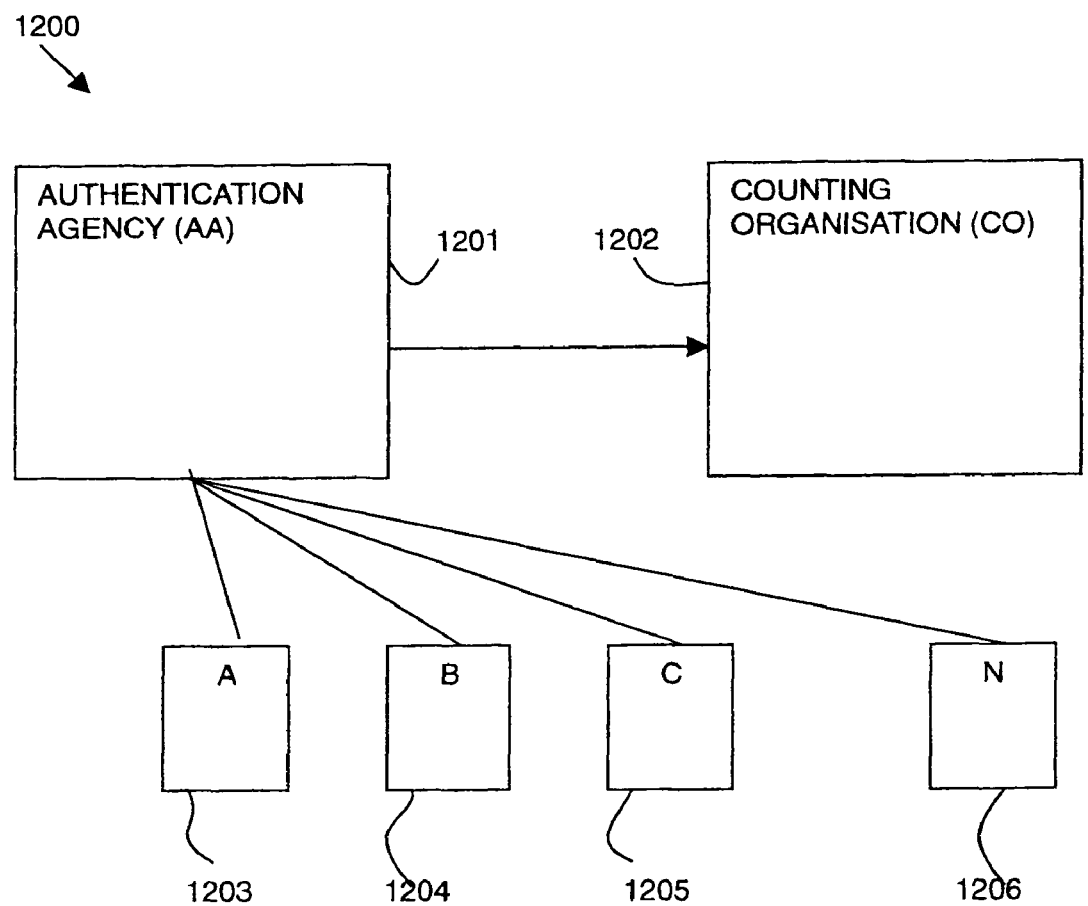

FIGS. 12A and 12B show an electronic voting system 1200 in which there is provided an Authentication Agency (AA) 1201 and a separate Counting Organization (CO) 1202. A plurality of voters 1203, 1204, 1205, 1206 are shown. In FIG. 12A, the voters 1203, 1204, 1205, 1206 communicate with both the AA 1201 and the CO 1202. In FIG. 12B, the voters 1203, 1204, 1205, 1206 send messages only to the AA 1201 and messages destined for the CO 1202 are forwarded by the AA 1201 on behalf of the voters 1203, 1204, 1205, 1206.

The flow shown in FIG. 12A is that voter Alice 1203 first requests a serial number from the AA 1201 empowering it to her name, address, date of birth, nationality, and records of the prohibited classes. The AA 1201 obtains confirmation of these and sends Alice her serial number. She then constructs the voting message with serial number, nonce, spoiler, and vote, which she then sends to the CO 1202.

However, this has the disadvantage that Alice must wait for the AA 1201 to confirm her identity before Alice receives her serial number and is able to vote. Another disadvantage is that Alice must send messages to both the AA 1201 and the CO 1202.

In the case of FIG. 12B, Alice 1203 sends her message to the CO 1202 via the AA 1201. This has the advantages that Alice 1203 takes only one action to complete her vote ad that the CO 1202 has no way of tracking Alice 1203 down using her electronic address.

However, the AA 1201 must not be able to read the vote. So the vote must be encrypted so that the CO 1202 but not the AA 1201 can read it. This is the method and system proposed here.

Figure 13:
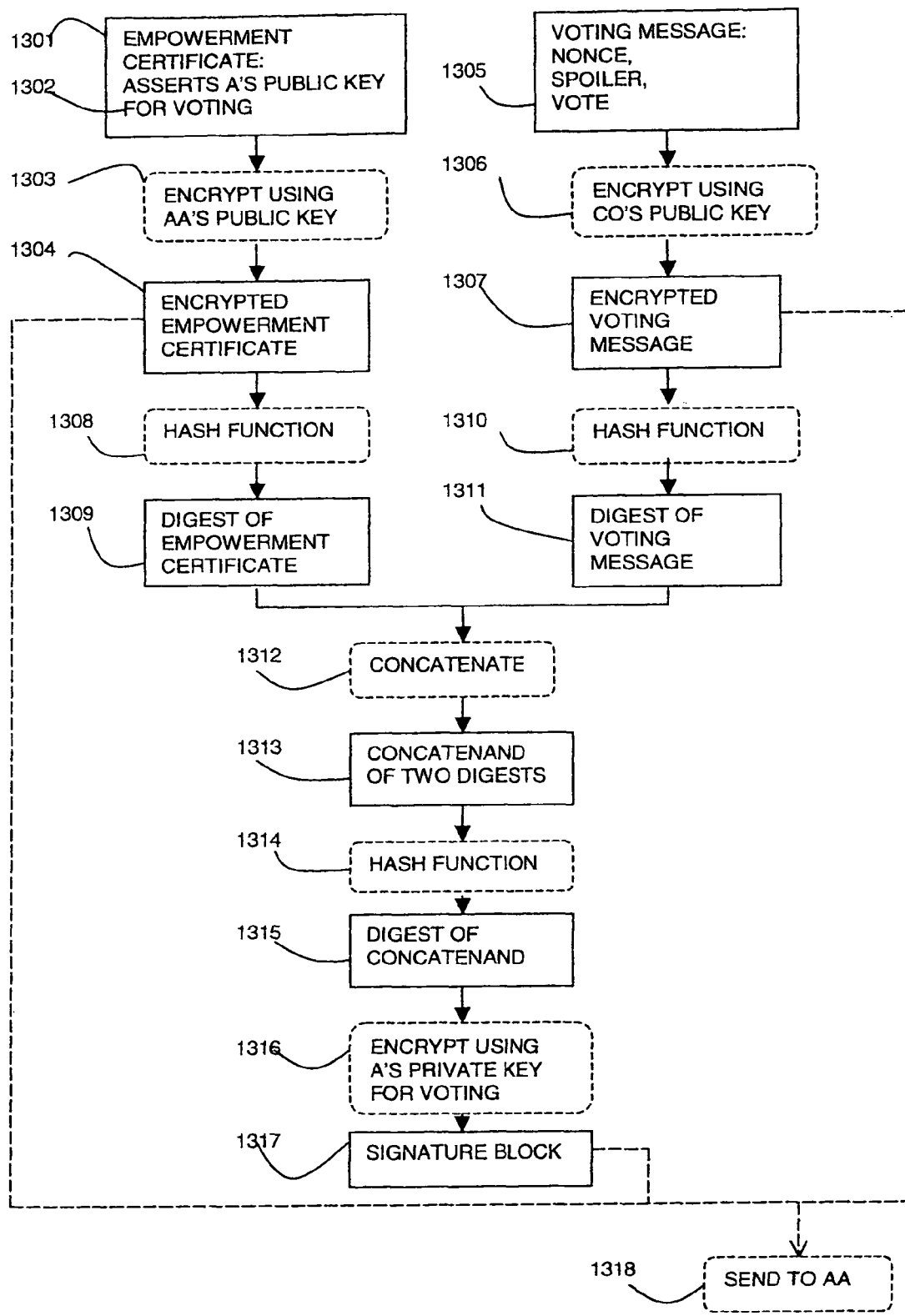
FIG. 13 is a diagram of a method of electronic voting in accordance with an aspect of the present invention.

Referring to FIG. 13, a diagram is provided illustrating a method of casting a vote. In the diagram actions are shown in dashed blocks with rounded corners. Objects are shown in solid line blocks.

Alice (as an example of a voter) generates an empowerment certificate 1301 which designates the AA as the relying entity and Alice empowers (and may also assert) in the empowerment certificate 1301 her name, address, date of birth, nationality and records of the prohibited classes. This is sufficient data to identify Alice uniquely. Alice also asserts in the empowerment certificate 1301 the public key 1302 of a private/public key pair which Alice is going to use for signing her voting form.

Empowerment certificates are described in detail in the section "The Empowerment Certificate". This section explains how data may be asserted by the certificate generator in which case the data appears in the certificate and how data may be empowered by the certificate generator in which case an indication of the data is given in the certificate and the certificate empowers the relying party to obtain the data from another source.

The empowerment certificate 1301 may also contain the technical data necessary for processing the certificate, for example, the cryptographic functions used.

The empowerment certificate 1301 is signed by Alice using her private key of the private/public signature key pair to confirm authenticity of the empowerment certificate 1301.

The empowerment certificate may be an X.509 v.3 certificate.

Alice encrypts 1303 the empowerment certificate 1301 using the public key of the private/public confidentiality key pair of the AA. This results in an encrypted empowerment certificate 1304. Parties may have more than one private/public key pair, for example a confidentiality key pair and a signature key pair.

Alice also creates a voting message 1305 which contains no serial number, but does contain a nonce, spoiler and vote. A nonce is a random number or other information provided by a party, in this case Alice. A nonce is typically a large number whose value until it is generated is unpredictable.

The described method and system do not require Alice (as an example of a voter) to generate a nonce. It will be useful to her if she wants to check that her vote has been recorded. If she does not wish to check if her vote has been recorded, then the nonce is irrelevant. Different implementations of this method are as follows:

One implementation may give Alice the option and choose a random nonce for her if she wishes and use a zero nonce if she does not—this has the advantage that zero nonces need not be published and only those who care have their nonces published.

Another implementation may generate a nonce anyway and sent it to the AA and the CO, and record it on Alice's computer—This has the advantage of being one less question for Alice to answer.

Alice encrypts 1306 the voting message 1305 using the public key of the private/public confidentiality key pair of the CO. This results in an encrypted voting message 1307.

Alice then applies a hash function 1308 to the encrypted empowerment certificate 1304 resulting in a digest 1309 of the encrypted empowerment certificate.

A hash function is a one-way function which maps an arbitrarily long piece of plain text into a comparatively small fixed-length bit-string which is the 'digest'. The hash function has the property that if the plain text is changed in any way, an entirely different value of digest is produced by the hash function. It should also not be possible to generate two forms of plaintext that have the same digest. Given P it should be easy to compute #P (hash of the plaintext). Given #P it should be effectively impossible to find P (the original plaintext). There are several different types of hash function that may be used.

Similarly, Alice applies a hash function 1310 to the encrypted voting message 1307 resulting in a digest 1311 of the encrypted voting message. The two digests 1309, 1311 are concatenated 1312 to obtain a resultant concatenand 1313 of the two digests 1309, 1311. A hash function 1314 is applied to the concatenand 1313 of the two digests 1309, 1311 resulting in a digest 1315 of the concatenand 1313. This results in an integrity block.

The digest 1315 of the concatenand 1313 is encrypted 1316 using Alice's private key of the key pair she is using for voting. This is the same key pair for which the public key has been asserted in the empowerment certificate 1301 to the AA. The result of the encrypted digest 1315 is a signature block 1317.

Alice sends 1318 the encrypted empowerment certificate 1304, the encrypted voting message 1307 and the signature block 1317 to the AA. Alice may now log off. She does not need to wait for a serial number and she does not need to send anything to the CO.

Figure 14:
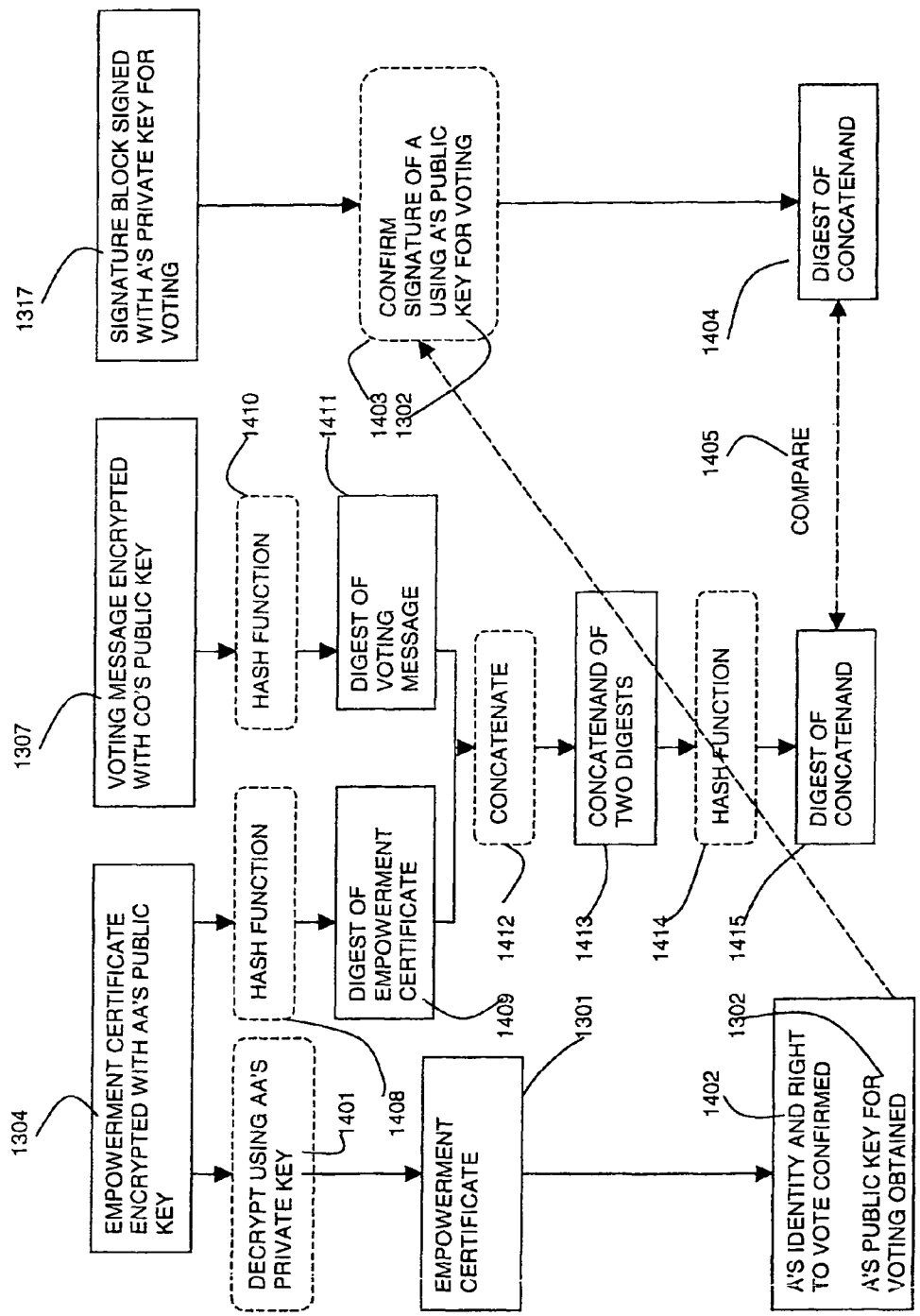
FIG. 14 is a diagram of a method of confirming a vote in accordance with an aspect of the present invention.

Referring now to FIG. 14, a method is described which is carried out by the AA on receipt of the encrypted empowerment certificate 1304, the encrypted voting message 1307 and the signature block 1317 from Alice.

The AA decrypts 1401 the encrypted empowerment certificate 1304 using the AA's private confidentiality key. The AA uses the empowerment certificate 1301 and the empowerment infrastructure to establish Alice's identity and her right to vote 1402. Alice's public key 1302 which she is using for voting which she asserted in the empowerment certificate 1301 is also obtained by the AA.

The AA cannot read the encrypted voting message 1307. The AA can, however, confirm that the two messages are as Alice sent them and are linked together by the signature block 1317 which has been received at the AA.

This confirmation is carried out by mirroring the process carried out by Alice of applying hash functions and concatenating the digests. The AA applies a hash function 1408 to the encrypted empowerment certificate 1304 resulting in a digest 1409 of the encrypted empowerment certificate. Similarly, the AA applies a hash function 1410 to the encrypted voting message 1307 resulting in a digest 1411 of the encrypted voting message. The two digests 1409, 1411 are concatenated 1412 to obtain a resultant concatenand 1413 of the two digests 1409, 1411. A hash function 1414 is applied to the concatenand 1413 of the two digests 1409, 1411 resulting in a digest 1415 of the concatenand 1413.

The signature block 1317 received by the AA, is decrypted 1403 using Alice's public key for voting 1302 which has been obtained 1402 from the validated empowerment certificate 1301. The decrypted signature block is the digest of the concatenand 1404.

The two digests of the concatenand 1415, 1404 can be compared 1405 and if they are the same this provides confirmation for the AA that the two messages are as Alice sent them and are linked by the signature block 1317.

The AA then assigns a serial number to Alice and constructs a message containing Alice's serial number, Alice's asserted public key for voting, and the digest of Alice's encrypted empowerment certificate. The AA signs the message with the AA's private signature key and sends to the message to the CO along with Alice's voting message 1307 and her signature block 1317.

Figure 15:
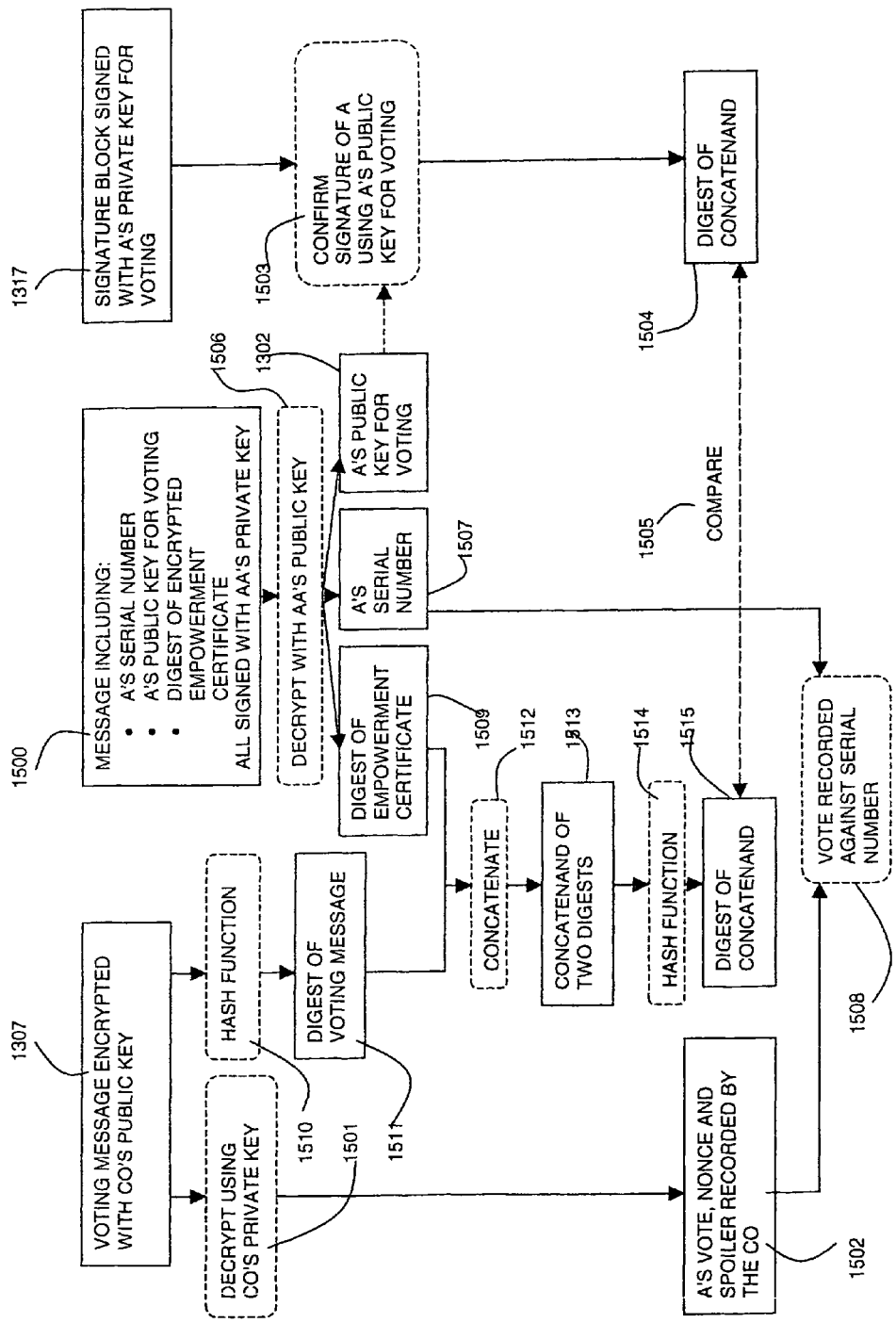
FIG. 15 is a diagram of a method of recording a vote in accordance with an aspect of the present invention.

Referring now to FIG. 15, a method is described which is carried out by the CO on receipt of the encrypted voting message 1307, the message 1500 (described in the previous paragraph) signed by the AA and the signature block 1317 which are all forwarded from the AA.

The voting message 1307 is decrypted 1501 using the private confidentiality key of the CO to obtain 1502 Alice's vote together with her nonce and spoiler.

The message 1500 signed by the AA is decrypted 1506 using the AA's public key resulting in the digest 1509 of the empowerment certificate, Alice's serial number 1507 and Alice's public key for voting 1302.

The CO can confirm that the voting message 1307 is as Alice sent it and is linked to the digest 1509 of the empowerment certificate sent by the AA by the signature block 1317.

This confirmation is carried out by mirroring the process carried out by both Alice and the AA of applying hash functions and concatenating the digests. The CO has the digest 1509 of the encrypted empowerment certificate from the message 1500. The CO applies a hash function 1510 to the encrypted voting message 1307 resulting in a digest 1511 of the encrypted voting message. The two digests 1509, 1511 are concatenated 1512 to obtain a resultant concatenand 1513 of the two digests 1509, 1511. A hash function 1514 is applied to the concatenand 1513 of the two digests 1509, 1511 resulting in a digest 1515 of the concatenand 1513.

The signature block 1317 received by the CO, is decrypted 1503 using Alice's public key for voting 1302 which has been obtained from the message 1500 from the AA. The decrypted signature block is the digest of the concatenand 1504.

The two digests of the concatenand 1515, 1504 can be compared 1505 and if they are the same this provides confirmation for the CO that the voting message 1307 is an unchanged original vote and has been assigned the serial number by the AA.

The serial number for Alice 1507 which is obtained from the message 1500 from the AA is combined with Alice's vote, nonce and spoiler 1502 and recorded 1508.

As before the AA should publish (at least to an audit team) the identities of the people who voted. There should never be fewer on this list than number of votes cast.

In this way, one message can be used for both authentication and counting of a vote. The process carried out by the voter is straightforward in that only one communication needs to be sent to a single party, the authentication agency. The authentication agency communicates with the counting agency. This will speed up communication as a network between the authentication agency and the counting agency can be faster than the Internet, which a voter will be using.

It should be understood that where the term encryption is used this does not necessarily imply that the result is confidential, since data encrypted with a private key can be decrypted by anyone holding the corresponding public key—which may be widely available.

Different hash functions can be used within the described method and system as long as the functions used are agreed between the parties.

The public/private key technologies used by the different parties can be different as long as the other parties know which technology is being used and can implement that technology.

The described method and system refer to the parties carrying out actions such as encryption; however, it will be appreciated that the computer software implementation of the method carries out theses functions on behalf of each party.

Improvements and modifications can be made to the foregoing without departing from the scope of the present invention.

The invention claimed is:

1. A method for supply of data relating to a described entity to a relying entity, the method comprising:
   generating, using a computer device, a first digital certificate signed with an electronic signature by a first signing entity and including:
      one or more attributes of the described entity;
      one or more attributes identifying the first signing entity;
      an indication of data relating to the described entity which is to be supplied;
      an indication of one or more sources for the data to be supplied; and
      one or more attributes identifying one or more relying entities to which the data is to be supplied;
   the relying entity forwarding the first digital certificate for processing; and
   after the processing, the one or more sources supplying the data indicated in the first digital certificate to the relying entity,
   wherein some or all of the data relating to the described entity is supplied by a second digital certificate to the relying entity, the second digital certificate signed with an electronic signature by a second signing entity and including:
      one or more attributes of the described entity including the data which is to be supplied;
      one or more attributes of the second digital certificate which include one or more attributes identifying the second signing entity; and
      one or more attributes identifying one or more relying entities to which the data is to be supplied, and
   wherein the first digital certificate authorizes the relying entity to use the first digital certificate to obtain the second digital certificate.

2. The method of claim 1, wherein the source can hold data or can refer to one or more further sources.

3. The method of claim 1, wherein the first signing entity is the described entity.

4. The method of claim 1, wherein the first digital certificate includes a reference, nonce or other data which the relying entity has previously requested to be included.

5. The method of claim 1, wherein the relying entity is authorized to obtain a second digital certificate which is marked as qualified.

6. The method of claim 1, wherein the second digital certificate includes one or more attributes of the first digital certificate.

7. The method of claim 1, wherein at least some of the contents of the first digital certificate is copied to the second digital certificate.

8. The method of claim 1, further comprising the relying entity forwarding the first digital certificate to an intermediate entity to obtain the data from the one or more sources.

9. The method of claim 8, wherein the intermediate entity generates the second digital certificate.

10. The method of claim 9, wherein the second digital certificate includes one or more attributes identifying the relying entity which are different from the one or more attributes identifying the relying entity included in the first digital certificate.

11. The method of claim 10, wherein the second digital certificate includes one or more attributes identifying the described entity which are different from one or more attributes identifying the described entity included in the first digital certificate.

12. The method of claim 1, wherein the described entity generates a digital signature using a private key with a corresponding public key and the first signing entity includes the digital signature or a cryptographic digest thereof in the first digital certificate, and the data to be supplied to the relying entity includes the public key.

13. The method of claim 1, wherein the first digital certificate includes a period of validity.

14. The method of claim 13, wherein the second digital certificate includes a period of validity.

15. The method of claim 14, wherein the period of validity of the first digital certificate or the second digital certificate is that short period of time during which a digital signature was generated.

16. The method of claim 1, wherein the data indicated in the first digital certificate includes confirmation of a payment or debt due from the described entity identified in the first digital certificate to the relying entity identified in the first digital certificate.

17. The method of claim 16, wherein the second signing entity indicates in the second digital certificate a guarantee of a debt indicated as due in a first digital certificate.

18. The method of claim 17, wherein a change in previously supplied data is indicated by the supply of a list identifying the second digital certificate relating to the previously supplied data.

19. The method of claim 1, wherein a list identifies the first or second digital certificate specifying data which is no longer authorized to be supplied to the relying entity.

20. The method of claim 19, wherein the generation of the list includes one or more attributes identifying the relying entities to which the list relates.

21. The method of claim 20, further comprising generating and storing a list for the second digital certificates, which is indexed by one or more attributes identifying relying entities such that all second digital certificates in the list relevant to a relying entity can be identified.

22. A system for supply of data relating to a described entity to a relying entity, the system comprising:
   a first signing entity application residing on a computer device, a relying entity application and a data store wherein the data store holds data relating to the described entity;
   wherein the first signing entity application generates a first digital certificate signed with an electronic signature by the first signing entity application and including:
      one or more attributes of the described entity;
      one or more attributes identifying the first signing entity;
      an indication of data relating to the described entity which is to be supplied;
      an indication of one or more sources for the data to be supplied; and
      one or more attributes identifying one or more relying entities to which the data is to be supplied;
   the relying entity application forwards the first digital certificate for processing; and
   based on the processing, the one or more sources supplying the data indicated in the first digital certificate to the relying entity,
   wherein some or all of the data relating to the described entity is supplied by a second digital certificate to the relying entity, the second digital certificate signed with an electronic signature by a second signing entity and including:
      one or more attributes of the described entity including the data which is to be supplied;
      one or more attributes of the second digital certificate which include one or more attributes identifying the second signing entity; and
      one or more attributes identifying one or more relying entities to which the data is to be supplied, and
   wherein the first digital certificate authorizes the relying entity to use the first digital certificate to obtain the second digital certificate.

23. The system of claim 22, wherein a source holds the data store or refers to one or more further sources.

24. The system of claim 22, wherein the first signing entity is the described entity.

25. The system of claim 22, wherein the first digital certificate includes a reference, nonce or other data which the relying entity has previously requested to be included.

26. The system of claim 22, wherein the second digital certificate is provided for supplying the data relating to the described entity to the relying entity application, the second digital certificate signed with an electronic signature by the second signing entity application and including:
   the one or more attributes of the described entity including the data which is to be supplied;
   the one or more attributes of the second digital certificate which include one or more attributes identifying the second signing entity; and
   the one or more attributes identifying one or more relying entities to which the data is to be supplied.

27. The system of claim 22, wherein the system includes an intermediate entity application to which the relying entity application forwards the first digital certificate to obtain data from the data store.

28. The system of claim 22, wherein the system includes more than one data store holding data relating to the described entity.

29. The system of claim 22, wherein a data store has means for determining for an item of data included in the data store information concerning or contained in a first digital certificate which has referenced that item.

30. The system of claim 26, wherein a data store has means for determining for an item of data included in the data store information concerning or contained in a second digital certificate which provides the value of that item.

31. The system of claim 27, wherein the intermediate entity application has storage means for storing second digital certificates referenced by the relying entities identified in the second digital certificates.

32. The system of claim 22, further comprising a proxy entity application to which the relying entity application or the intermediate entity application forwards the first digital certificate to obtain information specifying to which data store or other proxy entity application the first certificate should next be forwarded.

33. A computer program product stored on a computer readable storage medium, the computer readable storage medium comprising executable instructions for performing the method comprising:
   generating a digital certificate signed with an electronic signature by a signing entity and including:
      one or more attributes of a described entity;
      one or more attributes identifying the signing entity;
      either an indication of data relating to the described entity which is to be supplied and an indication of one or more sources or the data itself; and
      one or more attributes identifying one or more relying entities to which the data is to be supplied,
   wherein the relying entity forwards the digital certificate to the one or more sources for obtaining the data, and
   the one or more sources supplies the data to the relying entity,
   wherein some or all of the data relating to the described entity is supplied by a second digital certificate to the relying entity, the second digital certificate signed with an electronic signature by a second signing entity and including:
      one or more attributes of the described entity including the data which is to be supplied;
      one or more attributes of the second digital certificate which include one or more attributes identifying the second signing entity; and
      one or more attributes identifying one or more relying entities to which the data is to be supplied, and
   wherein the digital certificate authorizes the relying entity to use the digital certificate to obtain the second digital certificate.

34. The method of claim 1, wherein the one or more sources is a registration authority.

35. The method of claim 34, wherein the registration authority is a direct registration authority.

36. The method of claim 35, wherein the registration authority is an indirect registration authority.

37. The method of claim 34, wherein the registration authority stores the data relating to the described entity.

38. The method of claim 34, wherein the registration authority:
  receives the first digital certificate forwarded from the relying entity;
  examines the first digital certificate; and
  pulls out of a database the data relating to the described entity.

39. The method of claim 1, wherein the first digital certificate includes a nonce which the relying entity has previously requested to be included.

40. The method of claim 1, wherein the relying entity checks or verifies the electronic signature.

41. The method of claim 40, wherein the data supplied to the relying entity by the one or more sources includes a public key corresponding to a private key controlled by the described entity.

42. The method of claim 41, wherein the first digital certificate permits the relying entity to gain access to the data which is held by the one or more sources.

43. The method of claim 42, wherein the described entity is a different entity than the one or more sources.

44. The system of claim 22, wherein the one or more relying entities checks or verifies the electronic signature.

45. The system of claim 44, wherein the data supplied to the relying entity by the one or more sources includes a public key corresponding to a private key controlled by the described entity.

46. The system of claim 45, wherein the first digital certificate permits the relying entity to gain access to the data which is held by the one or more sources.

47. The system of claim 46, wherein the described entity is a different entity than the one or more sources.

48. The computer program product of claim 33, wherein the one or more relying entities checks or verifies the electronic signature.

49. The computer program product of claim 48, wherein the data supplied to the relying entity by the one or more sources includes a public key corresponding to a private key controlled by the described entity.

50. The computer program product of claim 49, wherein the digital certificate permits the relying entity to gain access to the data which is held by the one or more sources.

51. The computer program product of claim 50, wherein the described entity is a different entity than the one or more sources.

52. A method for supply of data relating to a described entity to a relying entity, the method comprising:
  generating, using a computer device, a first digital certificate signed with an electronic signature by a first signing entity and including:
    one or more attributes of the described entity;
    one or more attributes identifying the first signing entity;
    an indication of data relating to the described entity which is to be supplied;
    an indication of one or more sources for the data to be supplied; and
    one or more attributes identifying one or more relying entities to which the data is to be supplied;
  the relying entity forwarding the first digital certificate for processing; and
  after the processing, the one or more sources supplying the data indicated in the first digital certificate to the relying entity,
  wherein the data indicated in the first digital certificate includes confirmation of a payment or debt due from the described entity identified in the first digital certificate to the relying entity identified in the first digital certificate; and
  a second signing entity indicates in a second digital certificate a guarantee of a debt indicated as due in the first digital certificate.

53. A system for supply of data relating to a described entity to a relying entity, the system comprising:
  a first signing entity application residing on a computer device, a relying entity application and a data store wherein the data store holds data relating to the described entity;
  wherein the first signing entity application generates a first digital certificate signed with an electronic signature by the first signing entity application and including:
    one or more attributes of the described entity;
    one or more attributes identifying the first signing entity;
    an indication of data relating to the described entity which is to be supplied;
    an indication of one or more sources for the data to be supplied; and
    one or more attributes identifying one or more relying entities to which the data is to be supplied;
  the relying entity application forwards the first digital certificate for processing; and
  based on the processing, the one or more sources supplying the data indicated in the first digital certificate to the relying entity,
  wherein the data indicated in the first digital certificate includes confirmation of a payment or debt due from the described entity identified in the first digital certificate to the relying entity identified in the first digital certificate; and
  a second signing entity indicates in a second digital certificate a guarantee of a debt indicated as due in the first digital certificate.

54. A computer program product stored on a computer readable storage medium, the computer readable storage medium comprising executable instructions for performing the method comprising:
  generating a digital certificate signed with an electronic signature by a signing entity and including:
    one or more attributes of a described entity;
    one or more attributes identifying the signing entity;
    either an indication of data relating to the described entity which is to be supplied and an indication of one or more sources or the data itself; and
    one or more attributes identifying one or more relying entities to which the data is to be supplied,
  wherein the relying entity forwards the digital certificate to the one or more sources for obtaining the data;
  the one or more sources supplies the data to the relying entity;
  the data indicated in the digital certificate includes confirmation of a payment or debt due from the described entity identified in the digital certificate to the relying entity identified in the digital certificate; and
  a second signing entity indicates in a second digital certificate a guarantee of a debt indicated as due in the digital certificate.

* * * * *